US010796188B2

(12) United States Patent
Higa

(10) Patent No.: US 10,796,188 B2
(45) Date of Patent: *Oct. 6, 2020

(54) IMAGE PROCESSING APPARATUS, IMAGE PROCESSING METHOD, AND PROGRAM TO IDENTIFY OBJECTS USING IMAGE FEATURES

(71) Applicant: NEC Corporation, Minato-ku, Tokyo (JP)

(72) Inventor: Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,083

(22) Filed: Nov. 22, 2019

(65) Prior Publication Data

US 2020/0089988 A1 Mar. 19, 2020

Related U.S. Application Data

(63) Continuation of application No. 14/411,587, filed as application No. PCT/JP2013/058796 on Mar. 26, 2013, now Pat. No. 10,540,566.

(30) Foreign Application Priority Data

Jun. 29, 2012 (JP) .................................. 2012-147239

(51) Int. Cl.
*G06K 9/46* (2006.01)
*G06K 9/62* (2006.01)

(52) U.S. Cl.
CPC ............. *G06K 9/46* (2013.01); *G06K 9/4676* (2013.01); *G06K 9/6211* (2013.01);
(Continued)

(58) Field of Classification Search
None
See application file for complete search history.

(56) References Cited

U.S. PATENT DOCUMENTS 6,711,293 B1 3/2004 Lowe
2011/0176734 A1* 7/2011 Lee .................... G06K 9/00671
382/197

(Continued)

FOREIGN PATENT DOCUMENTS

| CN | 101159855 A | 4/2008 |
|---|---|---|
| CN | 100583148 C | 1/2010 |
| CN | 102214302 A | 10/2011 |
| JP | 2000-090239 A | 3/2000 |
| WO | 2005-086092 A | 9/2005 |

OTHER PUBLICATIONS

International Search Report for PCT Application No. PCT/JP2013/058796, dated Jun. 4, 2013.

(Continued)

*Primary Examiner* — Nirav G Patel

(57) ABSTRACT

An image processing apparatus, an image processing method, and a program, provide accurate collation even when an image contains a number of identical or similar subjects. The image processing apparatus generates, with respect to feature points to be detected from a first image, a first local feature amount group including local feature amounts representing feature amounts of local regions containing the respective feature points, and a first coordinate position information group including coordinate position information. The image processing apparatus clusters the feature points of the first image based on the first coordinate position information group. The image processing apparatus collates, in units of clusters, the first local feature amount group with a second local feature amount group formed from local feature amounts of feature points detected from a second image.

7 Claims, 24 Drawing Sheets

(52) U.S. Cl.
CPC ......... *G06K 9/6212* (2013.01); *G06K 9/6272* (2013.01); *G06K 9/6277* (2013.01); *G06K 2009/4666* (2013.01)

(56) References Cited

U.S. PATENT DOCUMENTS

2011/0249899 A1* 10/2011 Wu .................. G06K 9/6211 382/190
2012/0155745 A1* 6/2012 Park .................. G06K 9/00637 382/154

OTHER PUBLICATIONS

Jianbo Shi, Malik et al, J., "Normalized Cuts and Image Segmentation", IEEE Transactions on Pattern Analysis and Machine Intelligence, vol. 22, No. 8, pp. 888-905, Aug. 2000.

Stijn van Dongen, "Graph Clustering by Flow Simulation", PhD thesis, University of Utrecht, 2000.

MacQueen J, "Some Methods for Classification and Analysis of Multivariate Observations", Proc. 5th Berkley Symposium on Math. Stat. and Prob. 1, Univ. of California Press, Berkeley and Los Angeles, pp. 84-95, 1967.

Linde, Y., Buzo, A., Gray, R., "An Algorithm for Vector Quantizer Design," IEEE Transactions on Communications, vol. 28, pp. 84-95, Jan. 1980.

Yoshihisa Meki, Toshiki Kindo, Hiroaki Kurokawa, and Iwao Sasase, "Competitive Models to Classify Unknown Data into Hierarchical Clusters through Unsupervised Learning". IEICE D-II, vol. J81-D-II, No. 9, pp. 2200-2210, Sep. 1998.

Zhiquiang Fan, et al. A Robust Datacluster-based SIFT Feature Matching Method, Journal of Computer Research and Development, vol. 49(5), May 31, 2012, p. 1123-1129, Cited in CNOA.

Chinese Office Action for CN Application No. 2013800340401 dated May 17, 2016 with English Translation.

* cited by examiner

FIG. 14

| FEATURE POINT NUMBER | RELATIVE COORDINATE POSITION (x, y) |
|---|---|
| 1 | 100, 100 |
| 2 | 50, −10 |
| ⋮ | ⋮ |

IMAGE PROCESSING APPARATUS, IMAGE PROCESSING METHOD, AND PROGRAM TO IDENTIFY OBJECTS USING IMAGE FEATURES

The present application is a Continuation application of Ser. No. 14/411,587 filed on Dec. 29, 2014, which is a National Stage Entry of PCT/JP2013/058796 filed on Mar. 26, 2013, which claims priority from Japanese Patent Application 2012-147239 filed on Jun. 29, 2012, the contents of all of which are incorporated herein by reference, in their entirety.

Several aspects of the present invention relate to an image processing apparatus, an image processing method, and a program.

BACKGROUND

There exist conventional techniques for detecting a number of characteristic points (feature points) within an image and extracting a feature amount within a local region around each feature point (local feature amount) in order to vigorously identify a subject in the image (e.g., a picture, a building, a printed matter, etc.) in accordance with the changes in imaging size and angle, as well as occlusions. Patent Document 1, for example, discloses an apparatus that uses a SIFT (Scale Invariant Feature Transform) feature amount.

The apparatus using a SIFT feature amount first detects a number of feature points from one image (referred to as first image) and generates a local feature amount from the coordinate position, scale (size), and angle of each of these feature points. Based on a local feature amount group consisting of these many generated local feature amounts, a local feature amount group associated with the first image is collated with a local feature amount group associated with a second image, whereby the identical or similar subjects in the images can be identified.

By "similar," it means that the subjects vary partially, that only certain parts of the subjects are displayed, or that the subjects look differently due to different angles for imaging the subjects in the images.

Patent Document 1: U.S. Pat. No. 6,711,293
Non-patent Document 1: Jianbo Shi, Malik, J., "Normalized Cuts and Image Segmentation," IEEE Transactions on Pattern Analysis and Machine Intelligence, vol. 22, no. 8, pp 888-905, 2000.
Non-patent Document 2: Stijn van Dongen, "Graph Clustering by Flow Simulation," PhD thesis, University of Utrecht, 2000.
Non-patent Document 3: MacQueen J, "Some Methods for Classification and Analysis of Multivariate Observations," Proc. $5^{th}$ Berkley Symposium on Math. Stat. and Prob. 1, Univ. of California Press, Berkeley and Los Angeles, pp. 84-95, 1967.
Non-patent Document 4: Linde, Y., Buzo, A., Gray, R., "An Algorithm for Vector Quantizer Design," IEEE Transactions on Communications, vol. 28, pp. 84-95, 1980.
Non-patent Document 5: Yoshihisa Meki, Toshiki Kindo, Hiroaki Kurokawa, and Iwao Sasase, "Competitive Models for Speculating Hierarchical Cluster Structures of Unknown Data through Unsupervised Clustering," IEICE D-II, vol. J81-D-II, no. 9, pp. 2200-2210, 1998.

SUMMARY

For example, in the case where one image contains a number of identical or similar subjects, such as when a number of identical commodities are displayed in a line, the technique described above generates a number of similar local feature amounts when. In this case, the system of identifying the individual subjects becomes deteriorated because it is difficult to correctly identify the individual subjects in the first image even when the first local feature amount group with a number of similar local feature amounts is collated with the second local feature amount group.

Several aspects of the present invention were contrived in view of the foregoing problems, and one of the objects of the present invention is to provide an image processing apparatus, an image processing method, and a program, which are capable of accurate collation even when an image contains a number of identical or similar subjects.

An image processing apparatus according to the present invention has: first feature amount generating means for generating, with respect to a plurality of feature points to be detected from a first image, a first local feature amount group including local feature amounts representing feature amounts of a plurality of local regions containing the respective feature points, and a first coordinate position information group including coordinate position information; region dividing means for clustering the feature points of the first image based on the first coordinate position information group; and collation means for collating, in units of clusters, the first local feature amount group with a second local feature amount group formed from local feature amounts of feature points detected from a second image.

An image processing method according to the present invention has the steps of: generating, with respect to a plurality of feature points to be detected from a first image, a first local feature amount group including local feature amounts representing feature amounts of a plurality of local regions containing the respective feature points, and a first coordinate position information group including coordinate position information; clustering the feature points of the first image based on the first coordinate position information group; and collating, in units of clusters, the first local feature amount group with a second local feature amount group formed from local feature amounts of feature points detected from a second image.

A program according to the present invention causes an image processing apparatus to execute the steps of: generating, with respect to a plurality of feature points to be detected from a first image, a first local feature amount group including local feature amounts representing feature amounts of a plurality of local regions containing the respective feature points, and a first coordinate position information group including coordinate position information; clustering the feature points of the first image based on the first coordinate position information group; and collating, in units of clusters, the first local feature amount group with a second local feature amount group formed from local feature amounts of feature points detected from a second image.

Note that such terms as "unit/part," "means," and "apparatus" used in the present invention not only simply refer to the physical means but also mean that the functions of these "unit/part," "means," and "apparatus" are realized by software. In addition, the functions of a single "unit/part," "means," or "apparatus" may be realized by two or more physical means or devices, and the functions of two or more "units/parts," "means," or "apparatuses" may be realized by a single physical means or device.

The present invention can provide an image processing apparatus, an image processing method, and a program, which are capable of accurate collation even when an image contains a number of identical or similar subjects.

DESCRIPTION OF DRAWINGS

FIG. 14 is a diagram showing a specific example of a data configuration of a relative coordinate position table according to the fifth exemplary embodiment;

DETAILED DESCRIPTION

Figure 1:
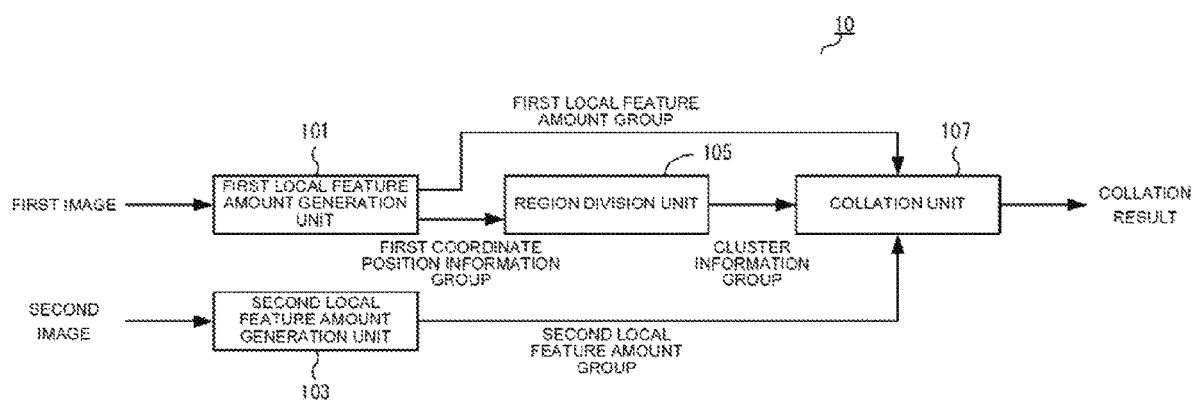
FIG. 1 is a diagram showing a configuration of an image processing apparatus according to a first exemplary embodiment.

Exemplary Embodiments of the present invention are now described below. In the following descriptions and the descriptions of the reference diagrams, the same or similar configurations are given the same or similar reference numerals respectively.

1 First Exemplary Embodiment

1.1 Functional Configurations

The functional configurations of an image processing apparatus 10 according to this exemplary embodiment are described hereinafter with reference to FIG. 1. FIG. 1 is a functional block diagram showing the functional configurations of the image processing apparatus 10 according to the present embodiment. Note that each of the functional configurations of the image processing apparatus 10 may be realized as a program that is not only stored temporarily in a memory but also operated on a CPU (Central Processing Unit).

The image processing apparatus 10 includes a first local feature amount generation unit 101, a second local feature amount generation unit 103, a region division unit 105, and a collation unit 107. In the following description, a first image contains a number of identical or similar subjects, and a second image contains only one subject. The same applies to the second and subsequent embodiments.

The first local feature amount generation unit 101 detects a number of feature points from the first image and outputs a first coordinate position information group consisting of the coordinate positions of these many feature points to the region division unit 105. The first local feature amount generation unit 101 also outputs to the collation unit 107 a first local feature amount group consisting of local feature amounts corresponding to peripheral regions (neighboring regions) including the feature points, based on the coordinate position of each feature point.

In the same manner as the first local feature amount generation unit 101, the second local feature amount generation unit 103 detects a number of feature points contained in the second image, generates a local feature amount corresponding to each feature point, and outputs a second local feature amount group consisting of these many local feature amounts to the collation unit 107.

The region division unit 105 clusters the feature points of the first image by using the first coordinate position information group output by the first local feature amount generation unit 101, and outputs, to the collation unit 107, a cluster information group consisting of a plurality of cluster information pieces associated with a plurality of clusters having one or more feature points.

Using the first local feature amount group output by the first local feature amount generation unit 101, the second local feature amount group output by the second local feature amount generation unit 103, and the cluster information group output by the region division unit 105, the collation unit 107 collates the first local feature amount group with the second local feature amount group in units of clusters, thereby determining the identity or similarity among the feature points. As a result, the collation unit 107 identifies the identical or similar subjects in the first and second images, and outputs the identification result (collation result). For the feature points that are determined to be identical or similar, the collation unit 107 may output information on a region in the first image in which the identify or similarity is determined, based on the coordinate position information on the feature points belonging to the corresponding clusters.

An operation of each of the configurations of the image processing apparatus 10 is described hereinafter in detail.

1.2 Details of Functions (1.2.1 Generating Feature Amounts)

As described above, the first local feature amount generation unit 101 detects a number of feature points from the first image and outputs to the region division unit 105 the first coordinate position information group configured by the coordinate positions of these many detected feature points. The first local feature amount generation unit 101 also generates a local feature amount from the coordinate position of each of the detected feature points and outputs, to the collation unit 107, the first local feature amount group configured by these generated local feature amounts.

The first local feature amount generation unit 101 may generate the local feature amounts by using the information on the scales and angles of the regions in addition to, for example, the coordinate positions of the respective feature points. For instance, the local feature amounts may be SIFT (Scale Invariant Feature Transform) feature amounts or other local feature amounts.

In the same manner as the first local feature amount generation unit 101, the second local feature amount generation unit 103 generates a local feature amount corresponding to each of the feature points in the second image, and outputs the second local feature amount group consisting of these many generated local feature amounts to the collation unit 107. A variety of methods can be considered as a method for detecting feature points and generating local feature amounts. The method described in Patent Document 1, for example, is one of the examples.

For example, a local feature amount of each of the feature points in the second image may be generated and stored in a database or the like in advance, so that not the second local feature amount generation unit 103 but the database can output the second local feature amount group. The same applies to the second and subsequent exemplary embodiments.

(1.2.2 Dividing Regions)

The region division unit 105 clusters the feature points of the first image by using the first coordinate position information group output by the first local feature amount generation unit 101, and outputs, to the collation unit 107, a cluster information group consisting of cluster information on each cluster configured by one or more feature points. In order to cluster the feature points, a method can be used in which, for example, the feature points with the coordinate positions thereof closest to each other, i.e., the feature points that are closest to each other, are sorted out into the same cluster. The distance between the two feature points may be, for example, the Euclidian distance, the Mahalanodis distance, or the street distance.

Another possible method for clustering the feature points can calculate the distances between all the feature points and cluster the calculated distances by graph cut. In this case, for instance, the distances between feature points taken as nodes are obtained as edges, which are then formed into a graph. This graph cut method may be, for example, the normalized cut method or Markov Cluster Algorithm. Note that the method described in Non-patent Document 1 can be used as the normalized cut method. The method described in Non-patent Document 2 can be used as the Markov Cluster Algorithm. Moreover, the k-means method, LBG method, or LBQ method, for example, can be used for clustering feature points. The specific methods described in Non-patent Document 3, Non-patent Document 4, and Non-patent Document 5 can be used as the k-means method, the LBG method, and the LBQ method, respectively.

Another possible method for clustering feature points may be a method for counting the number of feature points within each of analysis areas of a certain size and sorting out the feature points of a certain analysis area into the same cluster when the resultant count value corresponding to the number of feature points is equal to or greater than a predetermined threshold.

When generating the analysis areas, for example, a method for dividing the first image into grids of a certain size and obtaining these grids as the analysis areas. The analysis areas may or may not be, for example, overlapped on each other. In addition, the size of the analysis areas may be, for example, fixed or variable. When variable, a method may be used in which the size of the analysis areas is made smaller as the distance between the center of each analysis area and the center of the image becomes shorter and the size of the analysis areas is made bigger as the distance between the center of each analysis area and the center of the image becomes longer.

In order to sort out the feature points, a method for, for example, sorting out the feature points of the analysis area having the count value equal to or greater than the threshold into the same cluster, or a method for sorting out the feature points of this area and of the surrounding analysis areas into the same cluster, may be used. In the case where the analysis areas having the count value equal to or greater than the threshold are adjacent to or overlapped on each other, a method for, for example, sorting out the feature points of these analysis areas into the same cluster or into different clusters may be used.

Clustering feature points as described above brings about the effect of processing images faster than any of the methods described in Non-patent Documents 3 to 5.

(1.2.3 Collation)

Using the cluster information group output by the region division unit 105, the collation unit 107 collates the first local feature amount group with the second local feature amount group in units of cluster, and determines the identity or similarity between the characteristic amounts. The identity or similarity between the subjects in the images can be identified in this manner.

An example of collating the first local feature amount group with the second local feature amount group in units of clusters is now described. The distances between the local feature amounts are calculated in a local feature amount group belonging to a target cluster the first local feature amount group and in the second local feature amount group, and a correlation between the feature points of the first image and the feature points of the second image (which feature point of the first image corresponds to a feature point of the second image) is calculated based on the calculated distances. In the case of SIFT feature amounts, for example, the Euclidian distances may be used as the distances between the feature points. Here, feature points having the lowest distance value, for instance, may be corresponding feature points. There may also exist feature points having no correlations. For example, the presence/absence of correlations can be determined using the ratio between the smallest distance value and the second smallest distance value as a measure for evaluation. For example, when the number of corresponding feature points exceeds a threshold, the identity (or similarity) between the target cluster and the second image may be determined using the correlation obtained as described above.

Furthermore, the identity or similarity may be determined by means of geometrical investigation using the obtained correlation. For example, on the assumption that the geometrical relation between two images projection is based on transformation (homography), the projection transformation parameter may be estimated using a robust estimation technique, and outliers of the correlation that are input with respect to the estimation parameter may be obtained, to determine the identity or similarity based on the number of outliers. For example, RANSOC (Random Sample Consensus) or a least-squares method is considered to be used for the robust estimation technique.

1.3 Flow of Processes

Figure 2:
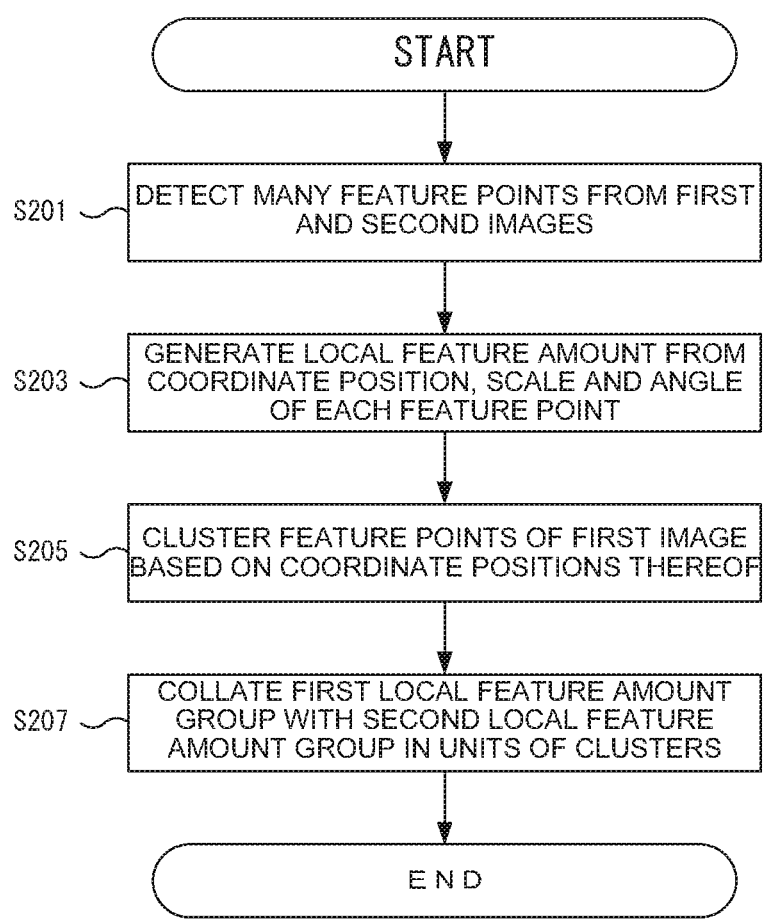
FIG. 2 is a flowchart showing a flow of processes executed by the image processing apparatus according to the first exemplary embodiment.

A flow of processes executed by the image processing apparatus 10 according to the present embodiment is described next with reference to FIG. 2. FIG. 2 is a flowchart showing the flow of processes executed by the image processing apparatus 10 according to the present embodiment.

Note that the steps described below can be executed in any orders or in parallel without contradicting the contents of the processes, and that an additional step may be added between the steps. In addition, a step that is described as configuring a single step for convenience may be executed in the form of a plurality of steps, and a step that is described as consisting of a plurality of steps for convenience may be executed in the form f a single step. The same applies to the second and subsequent embodiments.

The first local feature amount generation unit 101 detects a number of feature points from the first image, and the second local feature amount generation unit 103 detects a number of feature points from the second image (S201). Next, the first local feature amount generation unit 101 and the second local feature amount generation unit 103 each generate a local feature amount from the coordinate position of each feature point (if need be, the scales and angles may be used, as described above) (S203). The region division unit 105 clusters the feature points of the first image by using the first coordinate position information group consisting of the coordinate positions of the feature points of the first image (S205). The collation unit 107 collates the first local feature amount group with the second local feature amount group in units of clusters of the first local feature amounts, thereby identifying the identical or similar subjects in the images (S207).

1.4 Effects of the Present Embodiment

As described above, the image processing apparatus 10 according to the present embodiment clusters the many feature points detected from the first image based on the coordinate positions thereof and collates the first local feature amount group with the second local feature amount group in units of clusters. A number of identical or similar subjects in the images can accurately be identified by collating the local feature amounts in units of clusters in the manner described above.

2 Second Exemplary Embodiment

The second exemplary embodiment is now described. In the following description, the configurations that are the same as or similar to those described in the first exemplary embodiment are denoted the same reference numerals; thus, the descriptions thereof are omitted accordingly. Additionally, the descriptions of the effects of the present embodiment that are the same as those described in the first embodiment are often omitted. The same applies to the third and subsequent embodiments.

2.1 Functional Configurations

Figure 3:
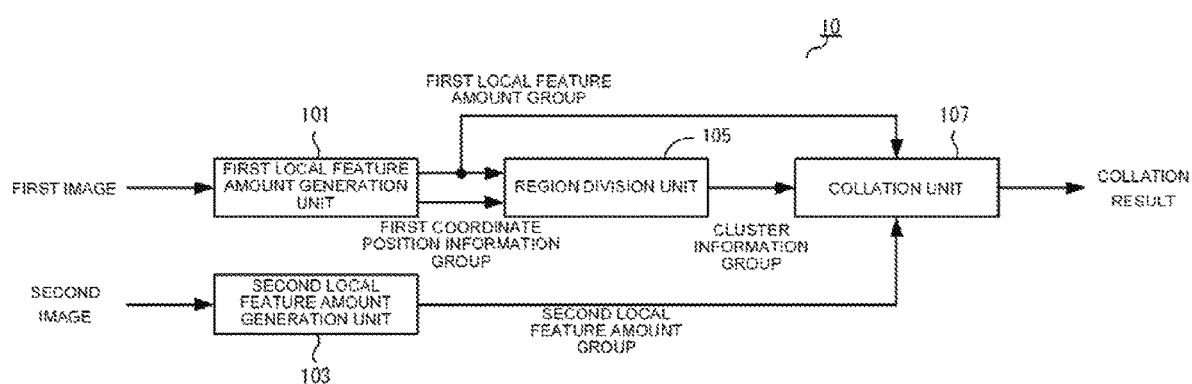
FIG. 3 is a diagram showing a configuration of the image processing apparatus according to a second exemplary embodiment.

FIG. 3 is a diagram showing the functional configurations of the image processing apparatus 10 according to the second embodiment. As shown in FIG. 3, the image processing apparatus 10 includes the first local feature amount generation unit 101, the second local feature amount generation unit 103, the region division unit 105, and the collation unit 107. The operations of the second local feature amount generation unit 103 and collation unit 107 are the same as those described in the first embodiment; thus, the descriptions thereof are omitted accordingly.

As in the first embodiment, the first local feature amount generation unit 101 detects a number of feature points of the first image and outputs a first coordinate position information group to the region division unit 105. The first local feature amount generation unit 101 also generates a first local feature amount group consisting of local feature amounts of the respective feature points of the first image, and outputs this first local feature amount group to the region division unit 105 and collation unit 107, as in the first embodiment.

The region division unit 105 clusters the feature points of the first image by using the first local feature amount group and first coordinate position information group output by the first local feature amount generation unit 101, and outputs a cluster information group representing the clustering result to the collation unit 107.

Figure 4:
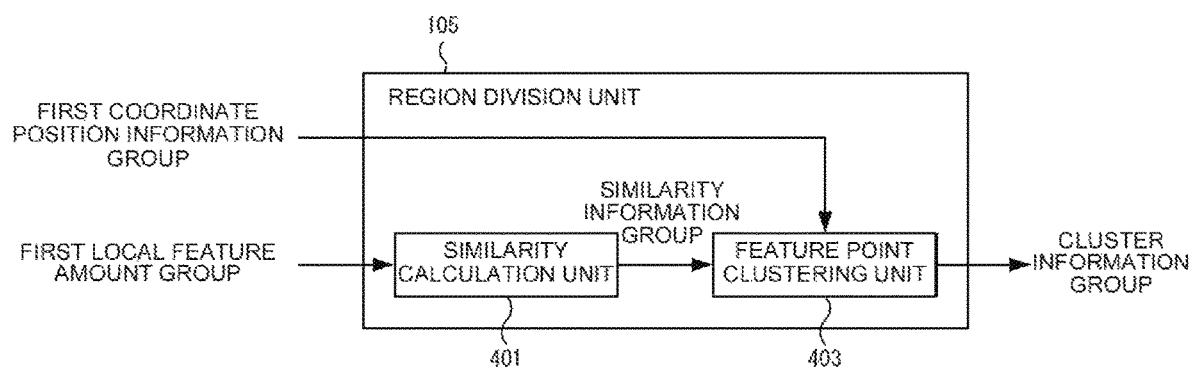
FIG. 4 is a diagram showing a configuration of a region division unit according to the second exemplary embodiment.
Figure 5:
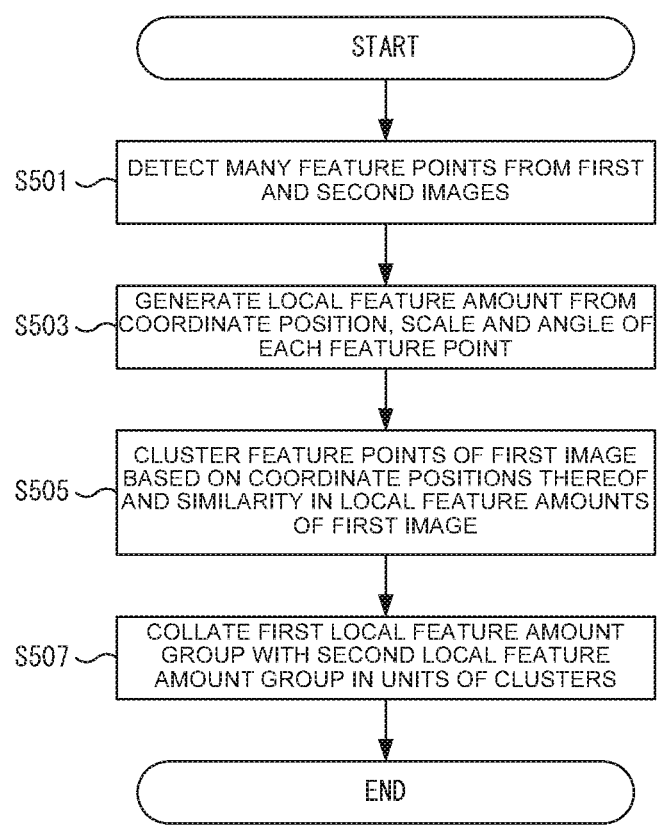
FIG. 5 is a flowchart showing a flow of processes executed by the image processing apparatus according to the second exemplary embodiment.

FIG. 4 shows the detailed functional configurations of the region division unit 105 according to the present embodiment. As shown in FIG. 5, the region division unit 105 includes a similarity calculation unit 401 and a feature point clustering unit 403.

The similarity calculation unit 401 calculates the degree of similarity between any two local feature amounts in the first local feature amount group output by the first local feature amount generation unit 101, and outputs a number of calculated similarity degrees to the feature point clustering unit 403 as a similarity information group. A possible method for calculating the similarity between local feature amounts may be a method for calculating, for example, the inter-feature point distance (e.g., the Euclidian distance) between any two local feature amounts and calculates the degree of similarity therebetween based on the distance. At this moment, for instance, the degree of similarity may be increased when the distance value is small, and the degree of similarity may be reduced when the distance value is large. Another method considered is to normalize the inter-feature point distance with a predetermined value and calculate the degree of similarity from the normalized value.

Using the first coordinate position information group output by the first local feature amount generation unit 101 and the similarity information group output by the similarity calculation unit 401, the feature point clustering unit 403 clusters the feature points of the first image and outputs a cluster information group representing the clustering result to the collation unit 107. In so doing, the feature point clustering unit 403 may cluster the feature points in such a manner that, for example, the local feature amounts having a large degree of similarity (small distance values) are sorted out into different clusters. A possible method for clustering the feature points can be a method for, for example, calculating the distance between any feature point in the first image and the gravity center of each cluster and then sorting out the feature points into the cluster corresponding to the shortest distance. In the case where any of the clusters has feature points having the similarity degree equal to or greater than a threshold, the feature points that are far from the gravity center of the cluster, for example, may be excluded from the cluster and sorted out into another cluster. Here, the distance between each feature point and the gravity center of the corresponding cluster may be, for example, the Euclidian distance, the Mahalanodis distance, or the street distance.

The feature points may be clustered by graph cut. For example, edge values may be calculated based on the distance between the feature points taken as nodes and the degree of similarity between the corresponding local feature amounts (e.g., the shorter the distance between the feature points and the greater the similarity between the corresponding local feature amounts, the greater the edge value between two nodes), and a graph of these edge values may be obtained by graph cut. The graph cut method may be, for example, the normalized cut method or Markov Cluster Algorithm.

2.2 Flow of Processes

A flow of processes executed by the image processing apparatus 10 according to the present embodiment is described hereinafter with reference to FIG. 5. FIG. 5 is a flowchart showing the flow of processes executed by the image processing apparatus 10.

The first local feature amount generation unit 101 detects a number of feature points from the first image, and the second local feature amount generation unit 103 detects a number of feature points from the second image (S501). Next, the first local feature amount generation unit 101 and the second local feature amount generation unit 103 each generate a local feature amount group having feature amounts of the corresponding feature points (a first local feature amount group and a second local feature amount group) based on the coordinate positions of the feature points (S503). The region division unit 105 clusters the feature points of the first image by using the first coordinate position information group and the first local feature amount group (S505). The collation unit 107 identifies the identical or similar subjects in the images by collating the first local feature amount group with the second local feature amount group in units of clusters (S507).

2.3 Effects of the Present Embodiment

In the present embodiment described above, these many feature points detected from the first image are clustered based on the coordinate positions and similarity thereof, and the first local feature amount group and the second local feature amount group are collated with each other in units of clusters, thereby identifying the identical or similar subjects in the images. As a result, the same effects as those of the first embodiment can be achieved.

Moreover, because the present embodiment tries to cluster the feature points corresponding to the similar local feature amounts into different clusters, the subjects can be identified more accurately than in the first embodiment even when the identical or similar subjects are located proximal to each other.

3 Third Exemplary Embodiment

3.1 Functional Configurations

Figure 6:
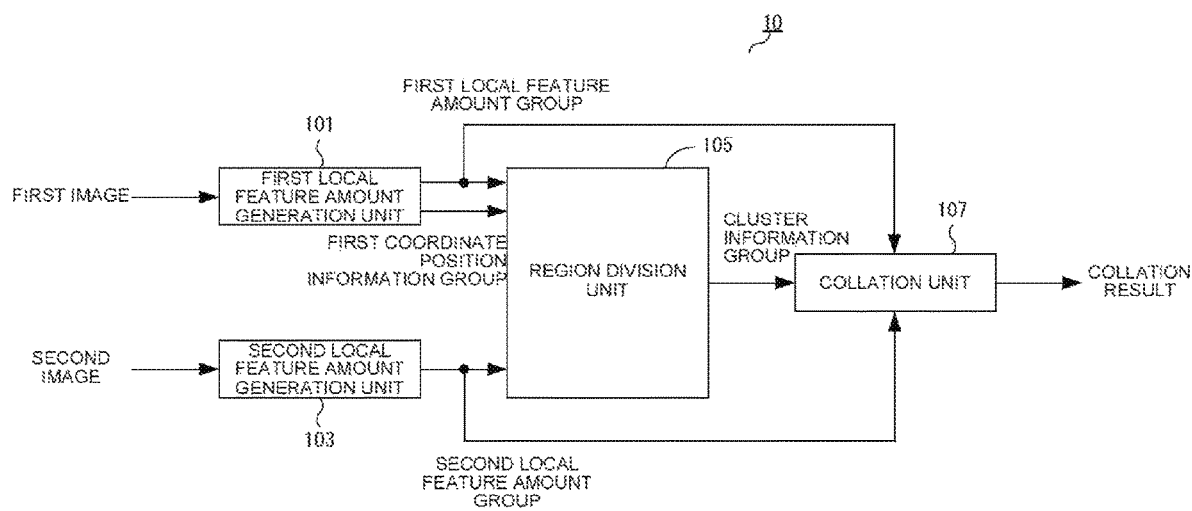
FIG. 6 is a diagram showing a configuration of the image processing apparatus according to a third exemplary embodiment.

The functional configurations of the image processing apparatus 10 according to a third exemplary embodiment are now described with reference to FIG. 6. FIG. 6 is a diagram showing the functional configurations of the image processing apparatus 10 according to the present embodiment.

As shown in FIG. 6, the image processing apparatus 10 includes the first local feature amount generation unit 101, the second local feature amount generation unit 103, the region division unit 105, and the collation unit 107. The operations of the first local feature amount generation unit 101 are the same as those described in the second exemplary embodiment, and the operations of the collation unit 107 are the same as those described in the first exemplary embodiment; thus, the descriptions thereof are omitted accordingly. The operations of the second local feature amount generation unit 103 and of the region division unit 105 are mainly described below.

In the same manner as in the first embodiment, the second local feature amount generation unit 103 generates local feature amounts corresponding to the feature points of the second image, and outputs a second local feature amount group, a collection of these local feature amounts, to the region division unit 105 and the collation unit 107. Using the first local feature amount group and first coordinate position information group that are output by the first local feature amount generation unit 101 and the second local feature amount group output by the second local feature amount generation unit 103, the region division unit 105 clusters the feature points of the first image and outputs a cluster information group representing the clustering result to the collation unit 107. The functional configurations and operations of the region division unit 105 are described hereinafter with reference to FIG. 7.

Figure 7:
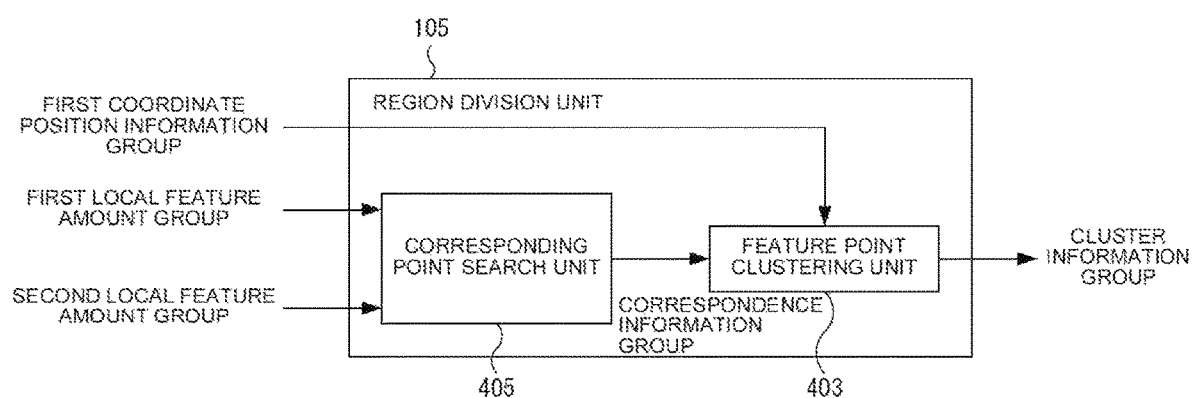
FIG. 7 is a diagram showing a configuration of the region division unit according to the third exemplary embodiment.

FIG. 7 is a diagram showing the configuration of the region division unit 105 according to the present embodiment. As shown in FIG. 7, the region division unit 105 includes a corresponding point search unit 405 and the feature point clustering unit 403.

Using the first local feature amount group output by the first local feature amount generation unit 101 and the second local feature amount group output by the second local feature amount generation unit 103, the corresponding point search unit 405 generates correspondence information that is the information on any of the local feature amounts of the first local feature amount group that matches a local feature amount of the second local feature amount group, i.e., the information on any of the feature points of the first image that matches a feature point of the second image. The corresponding point search unit 405 also outputs these many resultant pieces of correspondence information to the feature point clustering unit 403 as a correspondence information group.

The technique similar to the one used by the collation unit 107 of the first embodiment, for example, can be used for generating the correspondence information. In addition, a certain feature point in the second image may correspond to a plurality of feature points of the first image. The feature points in the first image may correspond one-on-one to the feature points of the second image.

Using the coordinate position information group output by the first local feature amount generation unit 101 and the correspondence information group output by the corresponding point search unit 405, the feature point clustering unit 403 selects, from among the feature points of the first image, the feature points that are in a correlation with the feature points of the second image, and clusters these selected feature points of the first image based on the coordinate positions thereof. The feature point clustering unit 403 also outputs a cluster information group representing the clustering result to the collation unit 107. The technique described in, for example, any of Non-patent Documents 3 to 5 can be used to cluster these feature points.

Also, in the case where the feature points of the second image correspond to a plurality of the feature points of the first image, the feature point clustering unit 403 may cluster the feature points of the first image into different clusters. In so doing, the feature point clustering unit 403 may cluster the feature points by graph cut. In this case, when the feature points of the second image correspond to a plurality of the feature points of the first image, graph cut is employed in such a manner as to generate a graph in which the edge values between the plurality of feature points of the first image taken as nodes become small, and to divide the nodes corresponding to small edge values. This graph cut method may be, for example, the normalized cut method or Markov Cluster Algorithm.

The feature point clustering unit 403 may sort out any two feature points of the first image into different clusters when the distance between these two feature points of the first image is short (e.g., when the distance value thereof is below a certain threshold) and the inter-feature point distance of the second image corresponding to these feature points is long (e.g., when the distance value thereof exceeds another threshold). Therefore, in the same manner as previously described, a technique for clustering feature points by graph cut can be used.

As in the first embodiment, for example, the feature point clustering unit 403 may also use a method for counting the number of feature points within each of analysis areas of a certain size and sorting out the feature points of each of these analysis areas into the same cluster when the resultant count value is equal to or greater than a predetermined threshold. Clustering the feature points in this manner brings about the effect of processing images faster than the techniques described in Non-patent Documents 3 to 5.

In addition, the third embodiment can be combined with the second embodiment.

3.2 Flow of Processes

Figure 8:
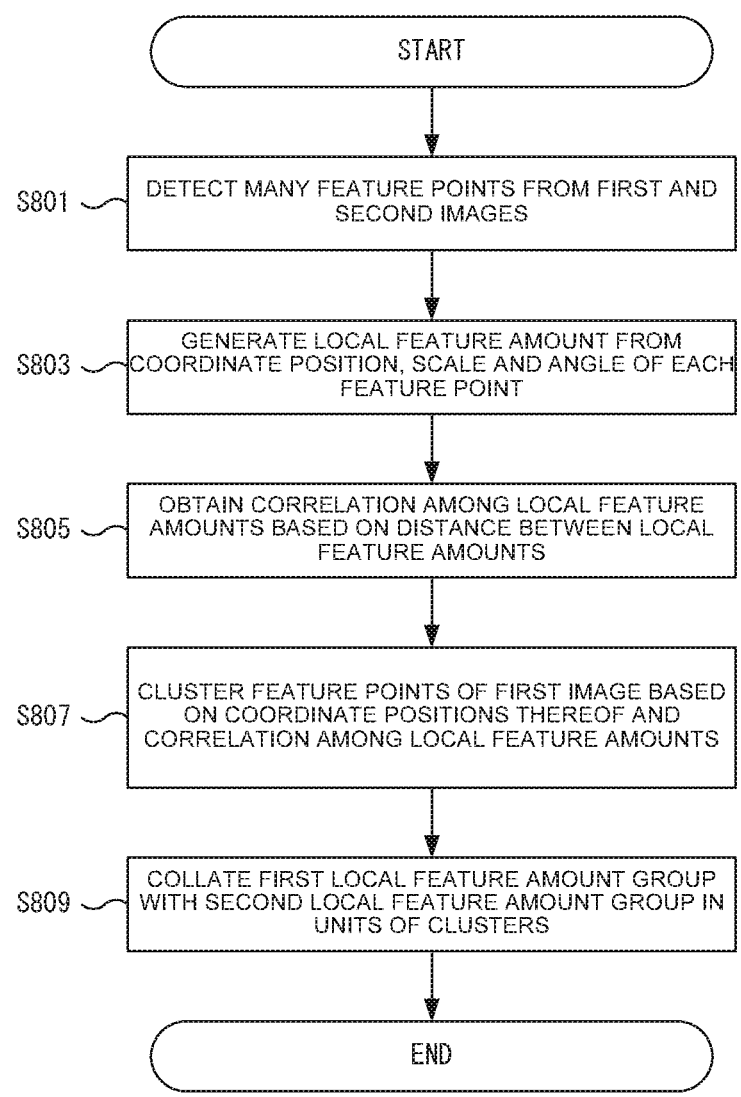
FIG. 8 is a flowchart showing a flow of processes executed by the image processing apparatus according to the third exemplary embodiment.

A flow of processes executed by the image processing apparatus 10 according to the present embodiment is described hereinafter with reference to FIG. 8. FIG. 8 is a flowchart showing the flow of processes executed by the image processing apparatus 10.

The first local feature amount generation unit 101 detects a number of feature points from the first image. The second local feature amount generation unit 103 detects a number of feature points from the second image (S801). Next, the first local feature amount generation unit 101 and the second local feature amount generation unit 103 each generate a local feature amount from the coordinate position of each feature point (S803). The region division unit 105 obtains a first local feature amount correlation, the correlation between the feature points in these two images (S805). Using the first coordinate position information group and the correspondence information group, the region division unit 105 then selects, from among the feature points of the first image, the feature points that are in a correlation with the feature points of the second image, and clusters the selected feature points of the first image based on the coordinate positions thereof (S807). The collation unit 107 collates the first local feature amount group with the second local feature amount group in units of clusters, and identifies the identical or similar subjects in the images (S809).

3.3 Effects of the Present Embodiment

As described above, the image processing apparatus 10 according to the third embodiment selects the feature points out of the many feature points detected from the first image, and clusters these feature points matching the feature points of the second image, based on the coordinate positions thereof. The image processing apparatus 10 also collates the first local feature amount group with the second local feature amount group in units of clusters, and thereby identifies the identical or similar subjects in the images. As a result, the same effects as those of the first embodiment can be achieved.

Because the feature points corresponding to each other between the two images are clustered based on the coordinate positions thereof, a number of identical or similar subjects in the first image can be identified more accurately than in the first embodiment, even when a number of feature points of the first image are detected outside the subjects.

4 Fourth Exemplary Embodiment

4.1 Functional Configurations

Figure 9:
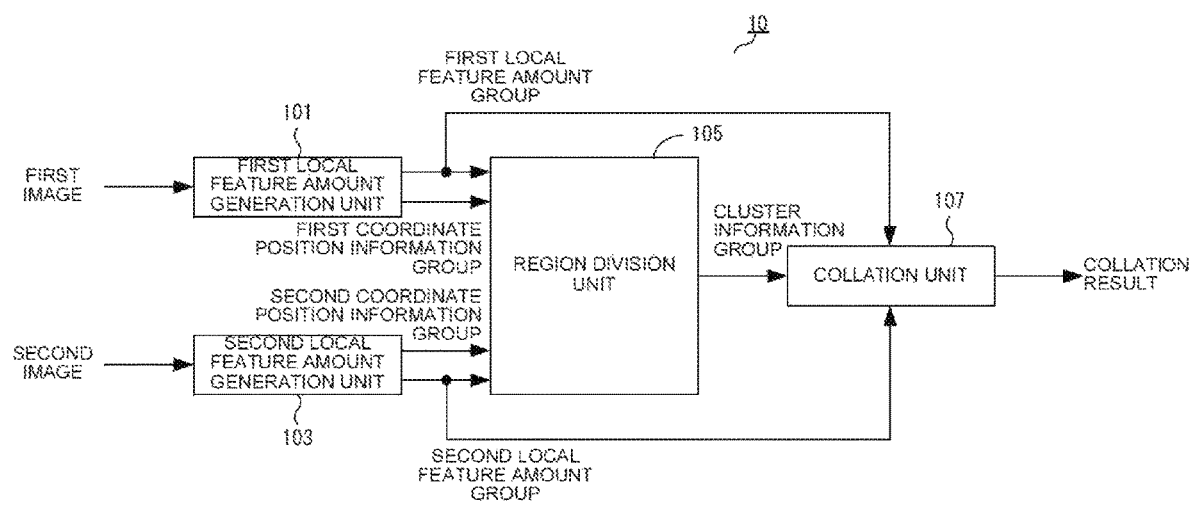
FIG. 9 is a diagram showing a configuration of the image processing apparatus according to a fourth exemplary embodiment.

The functional configurations of the image processing apparatus 10 according to a fourth exemplary embodiment are now described with reference to FIG. 9. FIG. 9 is a diagram showing the functional configurations of the image processing apparatus 10 according to the present embodiment.

The image processing apparatus 10 includes the first local feature amount generation unit 101, the second local feature amount generation unit 103, the region division unit 105, and the collation unit 107. The operations of the first local feature amount generation unit 101 are the same as those described in the second exemplary embodiment, and the operations of the collation unit 107 are the same as those described in the first exemplary embodiment; thus, the descriptions thereof are omitted accordingly. The operations of the second local feature amount generation unit 103 and of the region division unit 105 are mainly described hereinafter.

In the same manner as in the first embodiment, the second local feature amount generation unit 103 detects a number of feature points of the second image and outputs a second coordinate position information group to the region division unit 105. In the same manner as in the first embodiment, the second local feature amount generation unit 103 also generates a local feature amount for each of the feature points of the second image and outputs a second local feature amount group consisting of these local feature amounts to the region division unit 105 and the collation unit 107.

Using the first local feature amount group and first coordinate position information group output by the first local feature amount generation unit 101 and the second local feature amount group and second coordinate position information group output by the second local feature amount generation unit 103, the region division unit 105 clusters the feature points of the first image and outputs a cluster information group representing the clustering result to the collation unit 107. The configurations and operations of the region division unit 105 are described hereinafter with reference to FIG. 10.

Figure 10:
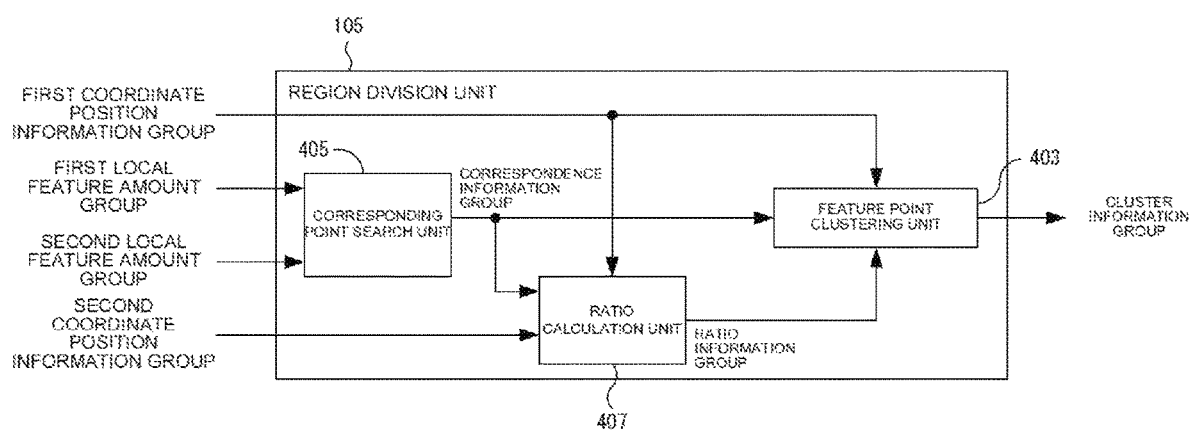
FIG. 10 is a diagram showing a configuration of the region division unit according to the fourth exemplary embodiment.

FIG. 10 is a diagram showing the configuration of the region division unit 105 of the present embodiment. As shown in FIG. 10, the region division unit 105 includes the corresponding point search unit 405, a ratio calculation unit 407, and the feature point clustering unit 403.

In the same manner as in the third embodiment, the corresponding point search unit 405 generates a correspondence information group and outputs this generated correspondence information group to the ratio calculation unit 407 and the feature point clustering unit 403.

Using the first local feature amount group output by the first local feature amount generation unit 101, the second local feature amount group output by the second local feature amount generation unit 103, and the correspondence information group output by the corresponding point search unit 405, the ratio calculation unit 407 calculates the ratio between the distance between any two feature points of the first image (referred to as "inter-feature point distance," hereinafter) and an inter-feature point distance in the second image corresponding to these feature points, and outputs the resultant many ratios to the feature point clustering unit 403 as a ratio information group. The Euclidian distance, the Mahalanodis distance, or the street distance, for example, can be used as the inter-feature point distance.

Using the first coordinate position information group output by the first local feature amount generation unit 101, the correspondence information group output by the corresponding point search unit 405, and the ratio information group output by the ratio calculation unit 407, the feature point clustering unit 403 clusters the feature points of the first image and outputs a cluster information group representing the clustering result to the collation unit 107. The feature points are clustered in such a manner that, for example, the feature points between which the difference in calculated ratio is small are sorted out into the same cluster (the feature points between which the difference in ratio is large are sorted out into different clusters). In so doing, the feature points may be clustered by, for example, graph cut. More specifically, a graph can be generated in which the edge values between feature points taken as nodes are increased based on the distance between the feature points and the difference in ratio therebetween, and graph cut can be executed on this graph. The graph cut method may be, for example, the normalized cut method or Markov Cluster Algorithm.

Using the coordinate position information group, correspondence information group, and ratio information group, the feature point clustering unit 403 can, for example, cluster the feature points of the first image as follows. In this case, by using the ratio information group corresponding to a certain feature point and a plurality of feature points around it, an assignment probability in which the feature point belongs to a certain cluster is calculated. In this case, the feature point clustering unit 403 clusters the feature point based on the calculated assignment probability and the coordinate position information of the feature point. In order to cluster the feature point, a method for, for example, selecting a feature point of the first image that corresponds to any of the feature points of the second image based on the correspondence information group, calculating the distance between the feature point and the gravity center of each cluster based on the coordinate position information and the assignment probability, and sorting out the feature point to the cluster in which the calculated distance is smallest.

The following formula, for example, can be used to calculate the distance between a certain feature point and the center of gravity of each cluster.

$$G_i = -\log(p_i \cdot f_i \cdot s_i) \qquad \text{[Formula 1]}$$

In Formula 1, $G_i$ represents the distance between a certain feature point of the first image and the gravity center of the $i^{th}$ cluster, $p_i$ the intra-cluster probability density function of the $i^{th}$ cluster, $f_i$ the cluster occurrence probability of the $i^{th}$ cluster, and $s_i$ the assignment probability in which the certain feature point of the first image belongs to the $i^{th}$ cluster. Note that the probability density distribution $p_i$ is obtained by the following formula 2.

$$p_i = \frac{1}{(2\pi)^{\frac{D}{2}} |\Sigma_i|^{\frac{1}{2}}} \times \exp\left\{\frac{1}{2}(v - r_i)^T \sum_i^{-1} (v - r_i)\right\} \qquad \text{[Formula 2]}$$

In Formula 2, D represents the dimensionality of input data, v the input data, r the center of gravity of the $i^{th}$ cluster, and $\Sigma_i$ the intra-cluster covariance matrix of the $i^{th}$ cluster.

The intra-cluster occurrence probability $f_i$ is a value greater than 0 but equal to or less than 1, and the method described in, for example, Non-patent Document 5 can be used as a method for updating the intra-cluster occurrence probability $f_i$.

A method for calculating the assignment probability $s_i$ is described next. The term $s_i$ can be calculated in the following manner by using, for example, the inter-feature point distance in the first image and the inter-feature point distance in the second image.

First, the ratio $ratio_{nk}$ between the inter-feature point distance in the first image and the inter-feature point distance in the second image is calculated by the following formula.

$$ratio_{nk} = \frac{\sqrt{\|v_n - v_k\|^2}}{\sqrt{\|u_{n'} - u_{k'}\|^2}} \qquad \text{[Formula 3]}$$

Here, $v_n$ represents the coordinate position of the $n^{th}$ feature point of the first image, $u_{n'}$ the coordinate position of the $n'^{th}$ feature point in the second image that corresponds to the feature point represented by $v_n$, $v_k$ the coordinate position of the feature point whose distance to $v_n$ is the $k_{th}$ shortest distance among the feature points in the vicinity of the feature point represented by $v_n$, and $u_{k'}$ the coordinate position of the $k'^{th}$ feature point in the second image that corresponds to the feature point represented by $v_k$. The ranges of k and k' are 0≤k and k'≤K (0<K).

The ratio $ratio_{nk}$ between the inter-feature point distances that is calculated as described above is characterized in varying depending on whether two feature points selected from the first image are of the same subject or of different subjects.

Next, the median value $median_n$ of the K ratios between the inter-feature point distances is obtained, and the assignment probability $s_i$ is calculated by Formula 4, Formula 5, and Formula 6.

$$s_i = \begin{cases} \min_{label_{nk}=i} \left\{ \exp\left\{ -\frac{\left(\frac{ratio_{nk} - median_n}{median_n}\right)^2}{2\alpha} \right\} \right\} & \text{if } (N_i \neq 0) \\ \varepsilon & \text{else} \end{cases}$$ [Formula 4]

$$N_i = \sum_k \delta(k, i)$$ [Formula 5]

$$\delta(k, i) = \begin{cases} 1 & \text{if } (label_{nk} = i) \\ 0 & \text{else} \end{cases}$$ [Formula 6]

Here, $label_{nk}$ represents the cluster number of the cluster to which the $k_{th}$ feature point among the K feature points in the vicinity of the $n^{th}$ feature point of the first image belongs, $N_i$ the number of feature points among approximately K feature points that belong to the cluster, and a and a any given values. For instance, $\alpha$ can be set to 0.5 and $\varepsilon$ to 0.000001.

4.2 Flow of Processes

Figure 11:
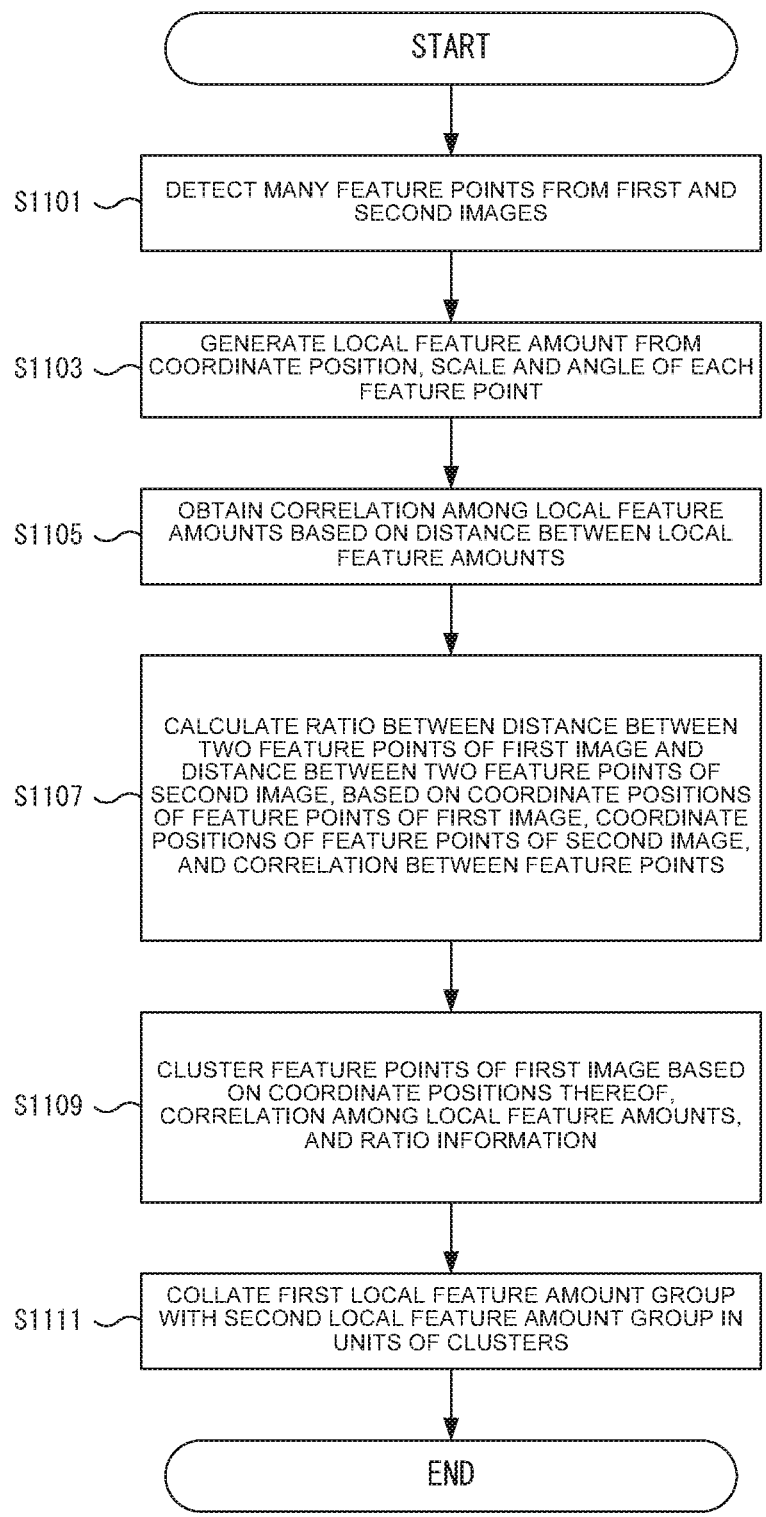
FIG. 11 is a flowchart showing a flow of processes executed by the image processing apparatus according to the fourth exemplary embodiment.

A flow of processes executed by the image processing apparatus 10 according to the present invention is described hereinafter with reference to FIG. 11. FIG. 11 is a flowchart showing the flow of processes executed by the image processing apparatus 10.

The first local feature amount generation unit 101 detects a number of feature points from the first image. The second local feature amount generation unit 103 detects a number of feature points from the second image (S1101). Next, the first local feature amount generation unit 101 and the second local feature amount generation unit 103 each generate a local feature amount (first local feature amount group and second local feature amount group) from the coordinate position of each feature point (S1103).

The region division unit 105 obtains the correlation among the local feature amounts, i.e., the correlation among the feature points between the similar images, based on the distance between each of the local feature amounts of the first local feature amount group and each of the local feature amounts of the second local feature amount group (S1105). Subsequently, using the first coordinate position information group, the second coordinate position information group, and the correspondence information group, the region division unit 105 calculates the ratio between the distance between two feature points in the first image and the distance between two feature points in the second image (S1107). The region division unit 105 also clusters the feature points of the first image by using the first coordinate position information group, the correspondence information group, and the ratio information group (S1109). The collation unit 107 collates the first local feature amount group with the second local feature amount group in units of clusters, thereby identifying the identical or similar subjects in the images (S1111).

4.3 Effects of the Present Embodiment

As described above, the image processing apparatus 10 according to the present embodiment clusters the feature points of the first image, which correspond to the feature points of the second image, based on the coordinate positions thereof and the ratio between the inter-feature point distances, and collates the first local feature amount group with the second local feature amount group in units of clusters, thereby identifying the identical or similar subjects in the images. In this manner, the same effects as those of the third embodiment can be achieved.

In addition, because the feature points are clustered based on the coordinate positions thereof and the ratio between the inter-feature point distances, the feature points can be clustered more accurately than in the third embodiment even when the identical or similar subjects in the first image are located proximal to each other. Therefore, a number of the identical or similar subjects in the images can be identified more accurately than in the third embodiment.

5 Fifth Exemplary Embodiment

5.1 Functional Configurations

Figure 12:
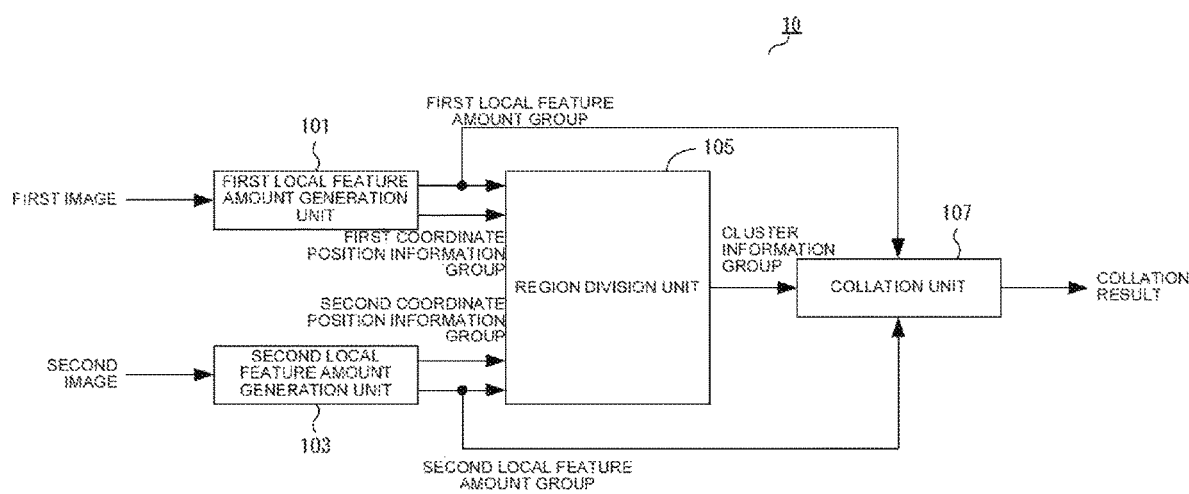
FIG. 12 is a diagram showing a configuration of the image processing apparatus according to a fifth exemplary embodiment.

The functional configurations of the image processing apparatus 10 according to the present embodiment are now described with reference to FIG. 12. FIG. 12 is a diagram showing the functional configurations of the image processing apparatus 10 according to the fifth exemplary embodiment. As shown in FIG. 12, the configurations of the image processing apparatus 10 are the same as that described in the fourth exemplary embodiment. However, the functional configurations and operations of the region division unit 105 of the present embodiment are different from those described in the fourth embodiment. The configurations and operations of the region division unit 105 are described hereinafter with reference to FIG. 13.

Figure 13:
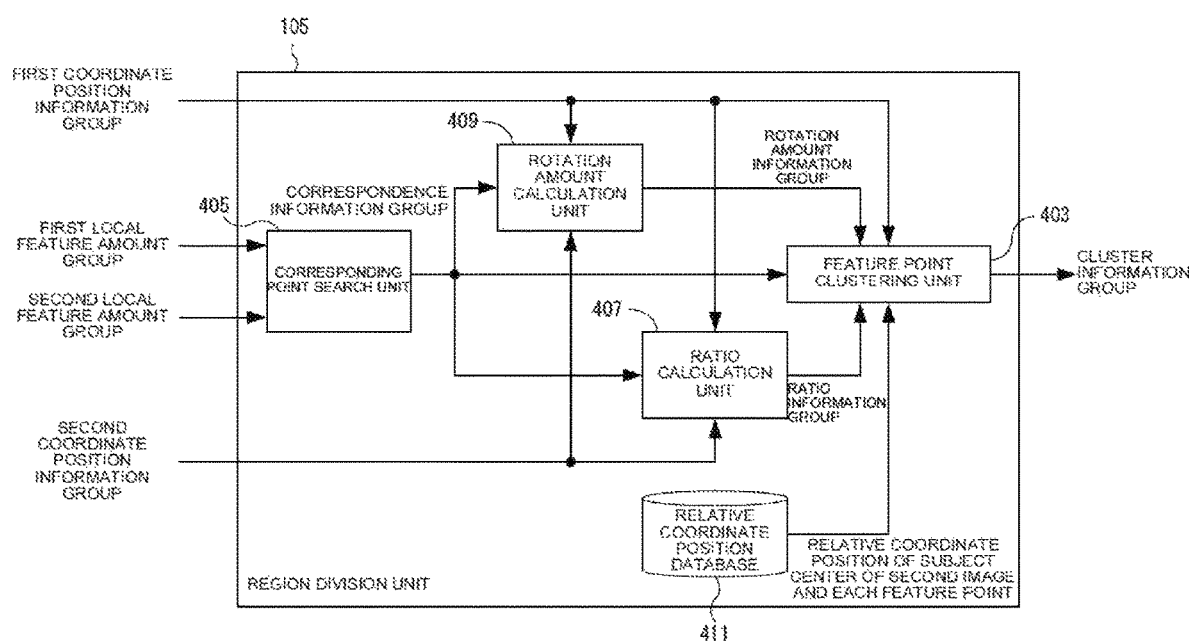
FIG. 13 is a diagram showing a configuration of the region division unit according to the fifth exemplary embodiment.

FIG. 13 is a diagram showing the functional configurations of the region division unit 105 according to the present embodiment. As shown in FIG. 14, the region division unit 105 includes the corresponding point search unit 405, the ratio calculation unit 407, a rotation amount calculation unit 409, a relative coordinate position database 411, and the feature point clustering unit 403. The operations of the ratio calculation unit 407 are the same as those described in the fourth embodiment; thus, the descriptions thereof are omitted accordingly. The operations of the corresponding point search unit 405, rotation amount calculation unit 409, relative coordinate position database 411, and feature point clustering unit 403 are mainly described hereinafter.

In the same manner as in the third exemplary embodiment, the corresponding point search unit 405 generates a correspondence information group and outputs the generated correspondence information group to the ratio calculation unit 407, the rotation amount calculation unit 409, and the feature point clustering unit 403.

Using the first coordinate position information group output by the first local feature amount generation unit 101, the correspondence information group output by the corresponding point search unit 405, and the second coordinate position information group output by the second local feature amount generation unit 103, the rotation amount calculation unit 409 calculates the direction of a vector with two feature points in the first image and the direction of a vector with two feature points in the second image. The rotation amount calculation unit 409 also calculates the rotation amounts of the subjects in the first image from the calculated vector directions, and outputs the resultant many rotation amounts to the feature point clustering unit 403 in the form of a rotation amount information group.

The direction $\theta_{ij}^1$ of the vector with two points in the first image may be calculated by, for example, the following formula.

$$\theta_{ij}^1 = \tan^{-1}\left(\frac{y_i - y_j}{x_i - x_j}\right) \quad \text{[Formula 7]}$$

Here, x represents an x-coordinate value of a feature point, y a y-coordinate value of the feature point, and i and j feature point numbers.

Next, the direction $\theta_{nm}^2$ of the vector with two points in the second image may be calculated by, for example, the following formula.

$$\theta_{nm}^2 = \tan^{-1}\left(\frac{y_n - y_m}{x_n - x_m}\right) \quad \text{[Formula 8]}$$

Here, n represents the feature point number of a feature point in the second image that corresponds to the $i^{th}$ feature point in the first image, and m the feature point number of a feature point in the second image that corresponds to the $j^{th}$ feature point in the first image.

Next, the rotation amount may be calculated by the following formula using, for example, the directions of the vectors calculated by Formula 7 and Formula 8.

$$\theta_{ij} = \theta_{ij}^1 - \theta_{nm}^2 \quad \text{[Formula 9]}$$

Here, $\theta_{ij}$ represents the rotation amount of the vector with the $i^{th}$ and $j^{th}$ feature points in the first image.

The relative coordinate position database 411 has a table showing the relative coordinate positions of a reference point of the second image (e.g., the center of the subject) and each of the feature points of the second image. The reference point here is a predefined coordinate position in the second image. The reference point may also be the center of the subject, as described above, or an upper left coordinate position in the second image. In the following description, the reference point is described as the center of the subject.

The relative coordinate position database 411 according to the present embodiment is now described with reference to FIG. 14. FIG. 14 is a diagram showing a specific example of the relative coordinate position database 411. The relative coordinate position database 411 has such data items as a feature point number and a relative coordinate position. In the example shown in FIG. 14, the relative coordinate position represented by the coordinate position of the first feature point and the coordinate position of the center of the subject of the first feature point is (100, 100), and the relative coordinate position represented by the coordinate position of the second feature point and the coordinate position of the center of the subject of the second feature point is (50, −10).

Relative coordinate position $u_n'$ may be calculated by the following formula.

$$u_n' = [x_n' \ y_n']^T = [x_c - x_n \ y_c - y_n]^T \quad \text{[Formula 10]}$$

In Formula 10, n represents a feature point number, $x_n$ an x-coordinate value of the $n^{th}$ feature point, $y_n$ a y-coordinate value of the $n^{th}$ feature point, $x_c$ an x-coordinate value of the center of the subject, and $y_c$ a y-coordinate value of the center of the subject.

The feature point clustering unit 403 clusters the feature points of the first image by using the first coordinate position information group output by the first local feature amount generation unit 101, the correspondence information group output by the corresponding point search unit 405, the ratio information group output by the ratio calculation unit 407, the rotation amount information group output by the rotation amount calculation unit 409, and the relative coordinate positions stored in the relative coordinate position database 411. The feature point clustering unit 403 also outputs a cluster information group representing the clustering result to the collation unit 107.

The method for clustering the feature points can be a method for, for example, selecting, from among the feature points of the first image, a number of feature points corresponding to random feature points of the second image based on the correspondence information group, estimating the subject center points in the first image based on the coordinate positions of the selected feature points, and clustering the estimated subject center point based on the coordinate positions thereof.

The coordinate positions of the subject center points can be calculated by, for example, the following formula.

$$c_{ij} = v_i + \left(ratio_{ij} \times \begin{pmatrix} \cos\theta_{ij} & -\sin\theta_{ij} \\ \sin\theta_{ij} & \cos\theta_{ij} \end{pmatrix} \times u_n'\right) \quad \text{[Formula 11]}$$

Here, i and j each represent a feature point number, $v_i$ the coordinate position of the $i^{th}$ feature point in the first image, $c_{ij}$ the coordinate position of a subject center point, and n the feature point number of the feature point in the second image that corresponds to the $i^{th}$ feature point of the first image.

The method described in, for example, any of Non-patent Documents 3 to 5 can be used to cluster the subject center points.

The method for clustering the subject center points may be used in which, for example, the number of subject center points within each of analysis areas of a certain size is counted, and the subject center points within each of the analysis areas are sorted out into the same cluster when the resultant count value is equal to or greater than a predetermined threshold.

In order to generate the analysis areas, a method for, for example, dividing the first image into grids of a certain size and obtaining each of the grids as the analysis area, may be used. The analysis areas may or may not be overlapped on each other. The size of the analysis areas may be, for example, fixed or variable. When variable, a method may be used in which the size of the analysis areas is made smaller as the distance between the center of each analysis area and the center of the image becomes shorter and the size of the analysis areas is made bigger as the distance between the center of each analysis area and the center of the image becomes longer.

In order to sort out the subject center points, a method can be used in which, for example, the subject center points of a certain analysis area corresponding to the count value equal to or greater than the predetermined threshold, are sorted out into the same cluster, or another method can be used in which the subject center points in this analysis area and in the surrounding analysis areas are sorted out into the same cluster. In the case where the analysis areas corresponding to the count value equal to or greater than the predetermined threshold are adjacent to or overlapped on each other, the subject center points within these analysis areas may be sorted out into the same cluster or into different clusters.

Clustering the subject center points in this manner brings about the effect of processing images faster than the techniques described in Non-patent Documents 3 to 5.

After the processing described above, the feature point clustering unit 403 may, for example, obtain the cluster information of the $c_{ij}$ as the cluster information of the $v_i$.

5.2 Flow of Processes

Figure 15:
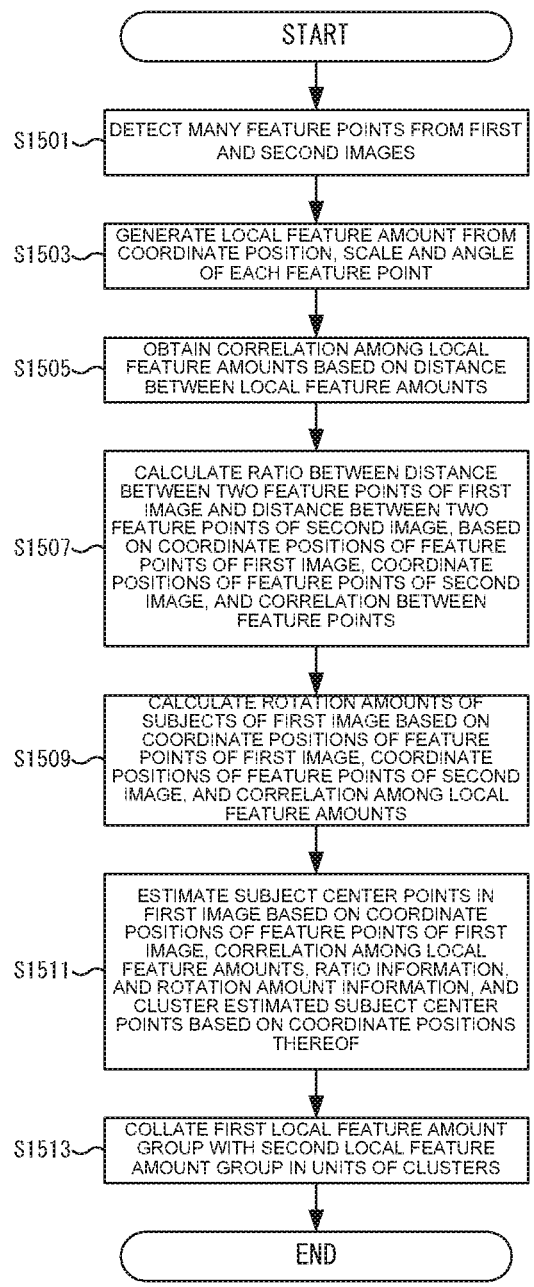
FIG. 15 is a flowchart showing a flow of processes executed by the image processing apparatus according to the fifth exemplary embodiment.

A flow of processes executed by the image processing apparatus 10 according to the present embodiment is described hereinafter with reference to FIG. 15. FIG. 15 is a flowchart showing the flow of processes executed by the image processing apparatus 10.

The first local feature amount generation unit 101 detects a number of feature points from the first image. The second local feature amount generation unit 103 detects a number of feature points from the second image (S1501). Next, the first local feature amount generation unit 101 and the second local feature amount generation unit 103 each generate a local feature amount from the coordinate position of each of the feature points (S1503). The region division unit 105 obtains the correlation among the local feature amounts, i.e., the correlation among the feature points in the two images, based on the distance between each of the local feature amounts of the first local feature amount group and each of the local feature amounts of the second local feature amount group (S1505). Subsequently, using the first coordinate position information group, the second coordinate position information group, and the correspondence information group, the region division unit 105 calculates the ratio between the distance between two feature points in the first image and the distance between two feature points in the second image (S1507). Moreover, using the first coordinate position information group, the second coordinate position information group, and the correspondence information group, the region division unit 105 calculates the rotation amount of each subject in the first image (S1509). With the first coordinate position information group, the correspondence information group, the ratio information group, and the rotation information group, the region division unit 105 estimates the subject center points of the first image and clusters these estimated subject center points based on the coordinate positions thereof (S1511). The collation unit 107 collates the first local feature amount group with the second local feature amount group in units of clusters, thereby identifying the identical or similar subjects in the images (S1513).

5.3 Effects of the Present Embodiment

As described above, the image processing apparatus 10 according to the present embodiment estimates the center points of the subjects by using the coordinate position of each of the feature points in the first image, the coordinate position of each of the feature points in the second image, the correlation among the feature points in the two images, and the relative coordinate positions that are generated in advance. The estimated subject center points are clustered based on the coordinate positions thereof, and the first local feature amount group and the second local feature amount group are collated with each other in units of clusters, whereby the identical or similar subjects are identified in the images. In this manner, the image processing apparatus 10 according to the present embodiment can achieve the same effects as those of the fourth embodiment.

In addition, because the feature points in the first image are gathered into the subject centers which are then clustered, the image processing apparatus 10 according to the present embodiment can cluster the feature points more accurately than in the fourth embodiment. Therefore, a number of identical or similar subjects in the images can be identified more accurately than in the fourth embodiment.

6 Sixth Exemplary Embodiment

6.1 Functional Configurations

Figure 16:
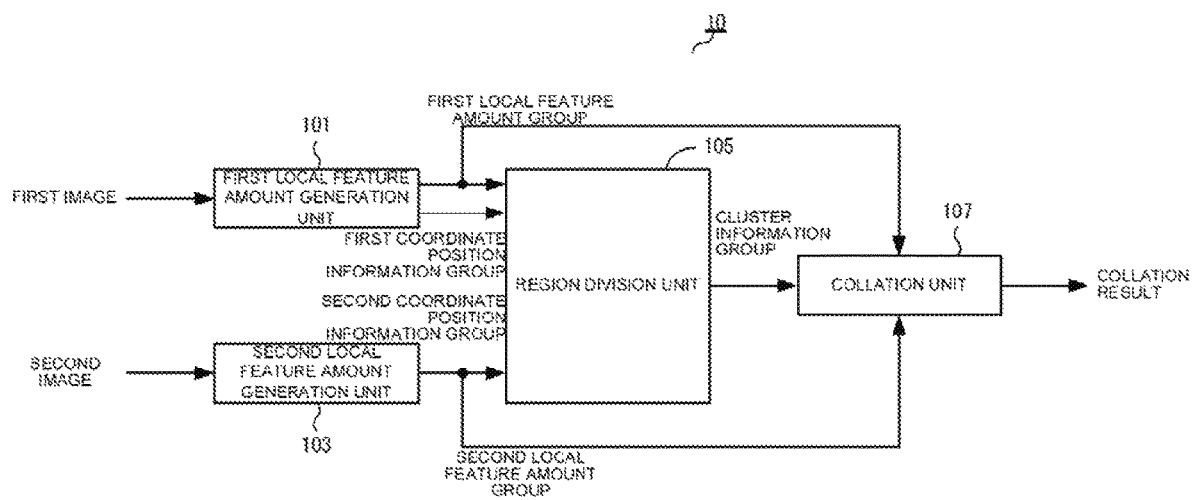
FIG. 16 is a diagram showing a configuration of the image processing apparatus according to a sixth exemplary embodiment.

The sixth exemplary embodiment is described hereinafter. First of all, the functional configurations of the image processing apparatus 10 according to the sixth embodiment are described with reference to FIG. 16. FIG. 16 is a block diagram showing the functional configurations of the image processing apparatus 10 according to the sixth embodiment.

The image processing apparatus 10 according to the present embodiment has the same configurations as those described in the third exemplary embodiment. However, the configurations and operations of the region division unit 105 are different from those described in the third embodiment. The configurations and operations of the region division unit 105 are described hereinafter with reference to FIG. 17.

Figure 17:
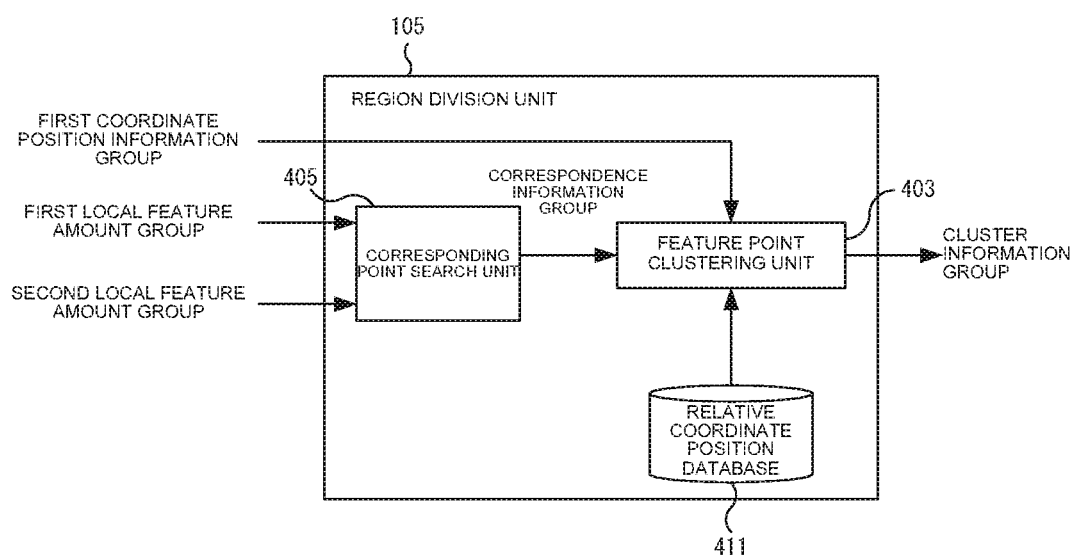
FIG. 17 is a diagram showing a configuration of the region division unit according to the sixth exemplary embodiment.

FIG. 17 is a diagram showing the configurations of the region division unit 105. As shown in FIG. 17, the region division unit 105 includes the corresponding point search unit 405, the relative coordinate position database 411, and the feature point clustering unit 403. The operations of the corresponding point search unit 405 are the same as those described in the third embodiment, and the configurations of the relative coordinate position database 411 are the same as those described in the fifth exemplary embodiment; thus, the descriptions thereof are omitted accordingly. The operations of the feature point clustering unit 403 are mainly described below.

The feature point clustering unit 403 clusters the feature points of the first image by using the first coordinate position information group output by the first local feature amount generation unit 101, the correspondence information group output by the corresponding point search unit 405, and the relative coordinate positions stored in the relative coordinate position database 411, and then outputs a cluster information group representing the clustering result to the collation unit 107. When clustering the feature points, for instance, a number of feature points of the first image corresponding to any of the feature points of the second image are selected from among the feature points of the first image based on the correspondence information group. Thereafter, the subject center points of the first image are estimated based on the coordinate positions of the selected feature points in the first image, and the estimated subject center points are clustered based on the coordinate positions thereof by using the same technique as the one described in the fifth embodiment.

The subject centers can be estimated using, for example, Formula 10 and Formula 12.

$$c_i = v_i + u'_n \quad \text{[Formula 12]}$$

Here, $c_i$ represents the coordinate position of a subject center point, $v_i$ the coordinate position of the $i^{th}$ feature point of the first image, and n the feature point number of a feature point in the second image that corresponds to the $i^{th}$ feature point of the first image.

6.2 Row of Processes

Figure 18:
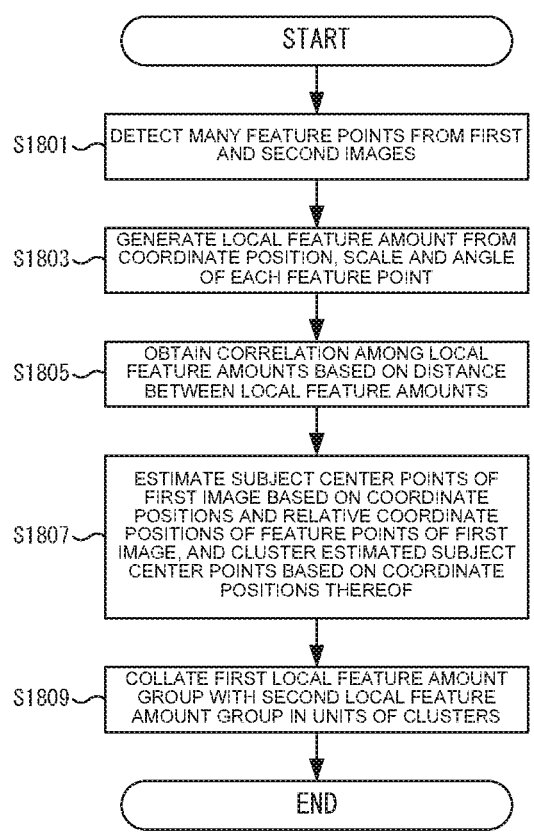
FIG. 18 is a flowchart showing a flow of processes executed by the image processing apparatus according to the sixth exemplary embodiment.

FIG. 18 is a flowchart showing a flow of processes executed by the image processing apparatus 10 according to the present embodiment. The flow of processes executed by the image processing apparatus 10 is described hereinafter with reference to FIG. 18.

The first local feature amount generation unit 101 detects a number feature points from the first image. The second local feature amount generation unit 103 detects a number of feature points from the second image (S1801). Next, the first local feature amount generation unit 101 and the second local feature amount generation unit 103 each generates a local feature amount corresponding to each of the feature points from the coordinate positions thereof (S1803). The region division unit 105 obtains the correlation among the local feature amounts, i.e., the correlation among the feature points in the two images, based on the distance between each of the local feature amounts of the first local feature amount group and each of the local feature amounts of the second local feature amount group (S1805).

Using the first coordinate position information group and the correspondence information, the region division unit 105 selects, from among the feature points of the first image, a number of feature points corresponding to any feature points of the second image, estimates the subject center points in the first image based on the selected feature points of the first image and the relative coordinate positions stored in the relative coordinate position database 411, and clusters the estimated subject center points based on the coordinate positions thereof (S1807). The collation unit 107 collates the first local feature amount group with the second local feature amount group in units of clusters, thereby identifying the identical or similar subjects in the images (S1809).

6.3 Effects of the Present Embodiment

As described above, the image processing apparatus 10 according to the sixth embodiment estimates the subject center points by using the coordinate position of each of the feature points in the first image, the correlation among the feature points in the two images, and the relative coordinate positions that are generated in advance. Furthermore, the estimated subject center points are clustered based on the coordinate positions thereof, and the first local feature amount group is collated with the second local feature amount group in units of clusters, whereby the identical or similar subjects in the images are identified. Therefore, the same effects as those of the first embodiment can be achieved when a congruent transformation is carried out between the acquired vertex of each subject in the first image and the acquired vertex of the subject in the second image.

7 Seventh Exemplary Embodiment

7.1 Functional Configurations

Figure 19:
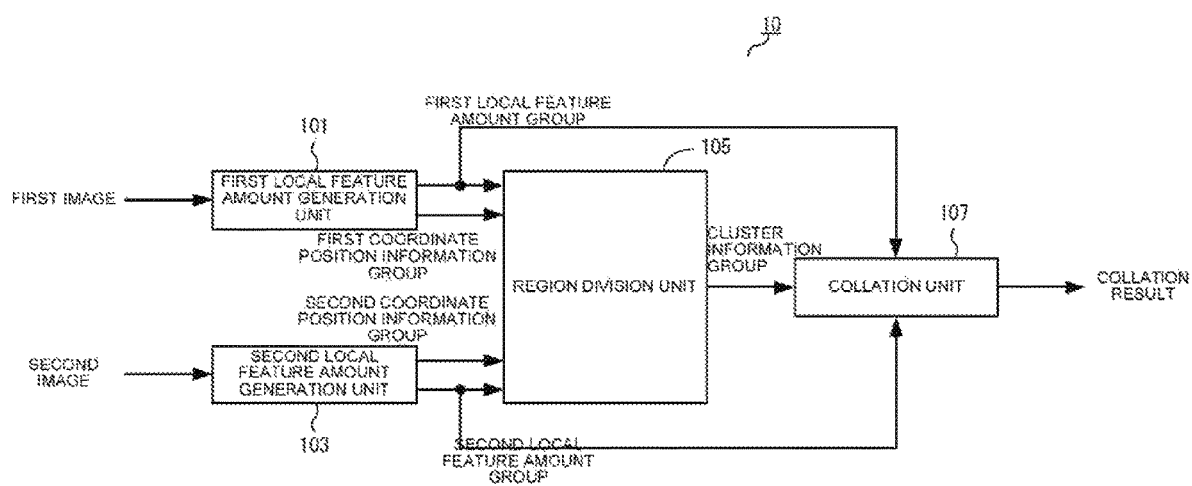
FIG. 19 is a diagram showing a configuration of the image processing apparatus according to a seventh exemplary embodiment.

The seventh exemplary embodiment is described next with reference to FIGS. 19 to 21. FIG. 19 is a diagram showing the functional configurations of the image processing apparatus 10 according to the present embodiment. The image processing apparatus 10 according to the present embodiment has the same configurations as those described in the fifth exemplary embodiment, except for the configurations and operations of the region division unit 105. The configurations and operations of the region division unit 105 are described hereinafter with reference to FIG. 20.

Figure 20:
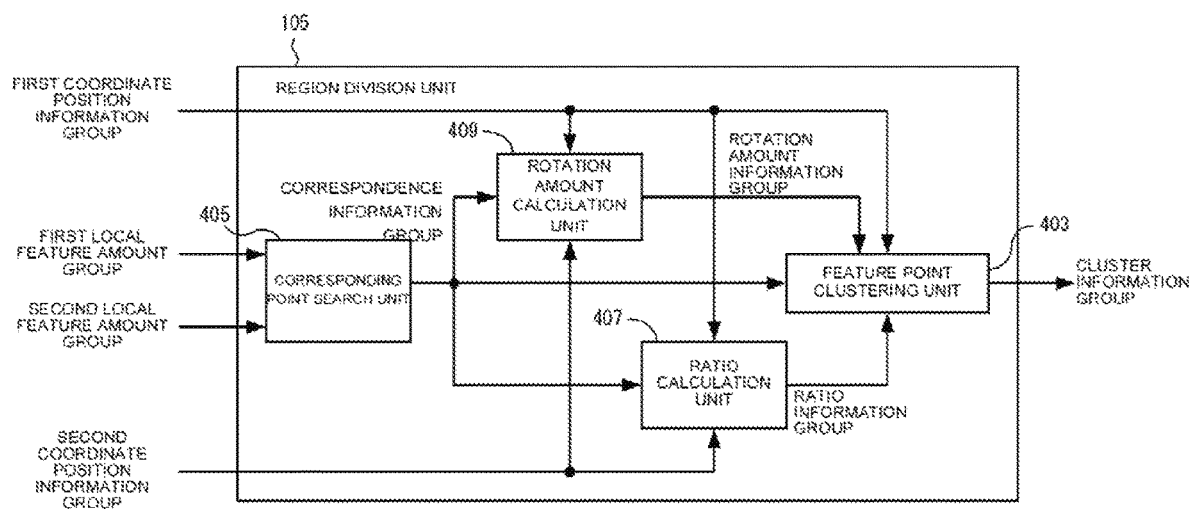
FIG. 20 is a diagram showing a configuration of the region division unit according to the seventh exemplary embodiment.

FIG. 20 is a diagram showing the configurations of the region division unit 105 according to the present embodiment. As shown in FIG. 20, the region division unit 105 according to the present embodiment includes the corresponding point search unit 405, the ratio calculation unit 407, the rotation amount calculation unit 409, and the feature point clustering unit 403. The operations of the ratio calculation unit 407 are the same as those described in the fourth exemplary embodiment, and the operations of the corresponding point search unit 405 and of the rotation amount calculation unit 409 are the same as those described in the fifth embodiment; thus, the descriptions thereof are omitted accordingly. The operations of the feature point clustering unit 403 are described hereinafter.

The feature point clustering unit 403 clusters the feature points of the first image by using the first coordinate position information group output by the first local feature amount generation unit 101, the correspondence information group output by the corresponding point search unit 405, the ratio information group output by the ratio calculation unit 407, and the rotation amount information group output by the rotation amount calculation unit 409. The feature point clustering unit 403 then outputs a cluster information group consisting of information on each of the clusters resulting from the foregoing clustering, to the collation unit 107.

Here, for example, the feature points with a small difference in the calculated ratio and a small difference in the rotation amount may be sorted out into the same cluster (the feature points with great differences in the ratio and rotation amount may be sorted out into different clusters). For instance, these feature points can be clustered by graph cut. For example, edge values may be calculated based on the distance between the feature points taken as nodes and the differences in the ratio and rotation amount (e.g., the smaller the value of the distance between the feature points and the smaller the differences in the ratio and rotation amount, the greater the edge value between two nodes), and graph cut may be executed on the resultant graph. The graph cut method may be, for example, the normalized cut method or Markov Cluster Algorithm.

7.2 Flow of Processes

Figure 21:
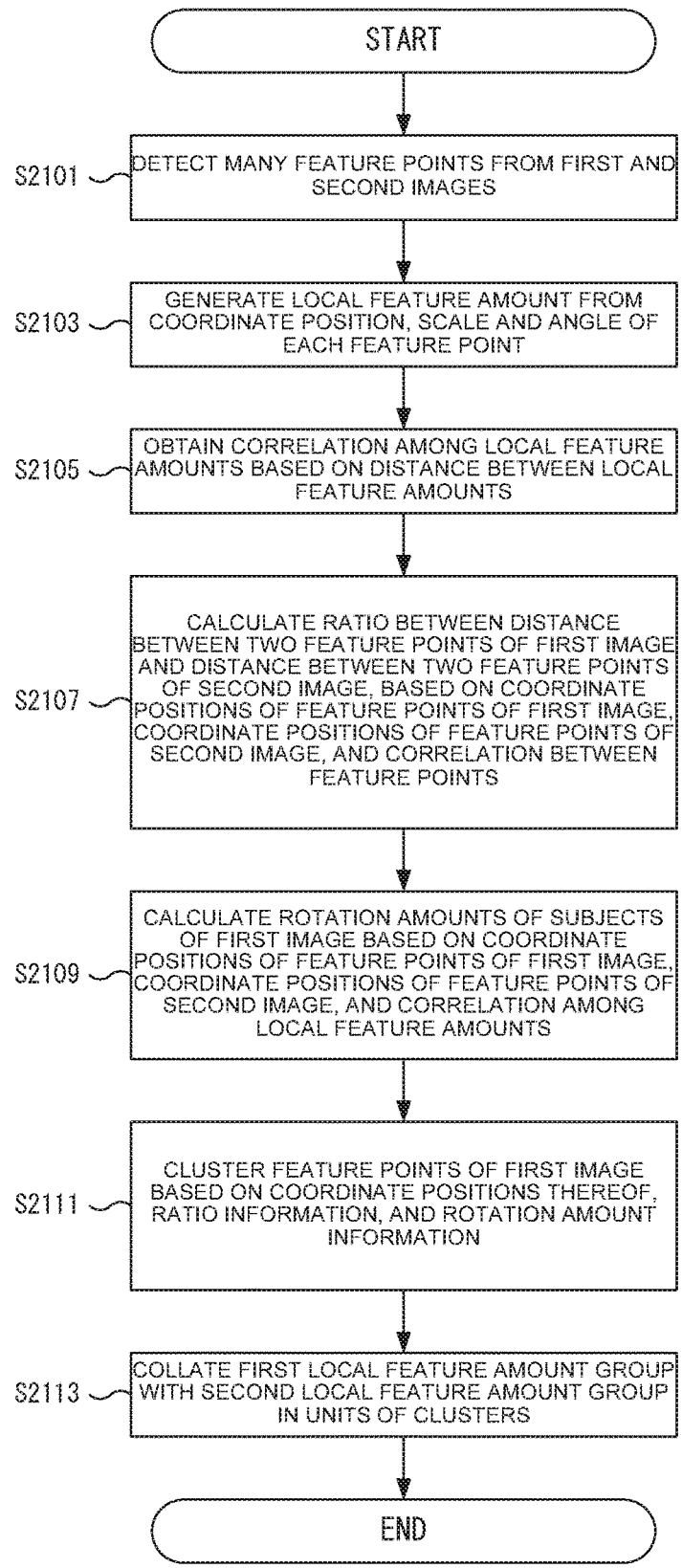
FIG. 21 is a flowchart showing a flow of processes executed by the image processing apparatus according to the seventh exemplary embodiment.

FIG. 21 is a flowchart showing a flow of processes executed by the image processing apparatus 10 according to the present embodiment. The processes executed by the image processing apparatus 10 according to the present embodiment are described hereinafter with reference to FIG. 21.

The first local feature amount generation unit 101 detects a number of feature points from the first image. The second local feature amount generation unit 103 detects a number of feature points from the second image (S2101). Next, the first local feature amount generation unit 101 and the second local feature amount generation unit 103 each generate a local feature amount from the coordinate position of each of the feature points (S2103).

The region division unit 105 obtains the correlation among the local feature amounts, i.e., the correlation among the feature points in the two images, based on the distance between each of the local feature amounts of the first local feature amount group and each of the local feature amounts of the second local feature amount group (S2105). Next, using the first coordinate position information group, the second coordinate position information group, and the correspondence information group, the region division unit 105 calculates the ratio between the distance between two feature points in the first image and the distance between two feature points in the second image (S2107). The region division unit 105 then calculates the rotation amount of each subject in the first image by using the first coordinate position information group, the second coordinate position information group, and the correspondence information group (S2109). Thereafter, the region division unit 105 clusters the feature points of the first image by using the first coordinate position information group, the correspondence information group, the ratio information group, and the rotation information group (S2111). The collation unit 107 collates the first local feature amount group with the second local feature amount group in units of clusters, and identifies the identical or similar subjects in the images (S2113).

7.3 Effects of the Present Embodiment

As described above, the image processing apparatus 10 according to the seventh embodiment estimates the rotation amount and ratio of each subject in the first image by using the coordinate position of each of the feature points in the first image, the coordinate position of each of the feature points in the second image, and the correlation among the feature points in the two images. Furthermore, based on the estimated rotation amounts and ratios, the feature points of the first image are clustered, and the first local feature amount group is collated with the second local feature amount group in units of clusters, whereby the identical or similar subjects are identified in the images. Therefore, the same effects as those of the first embodiment can be achieved when the adjacent, identical or similar subjects in the first image vary in size or rotation amount.

8 Eighth Exemplary Embodiment

8.1 Functional Configurations

Figure 22:
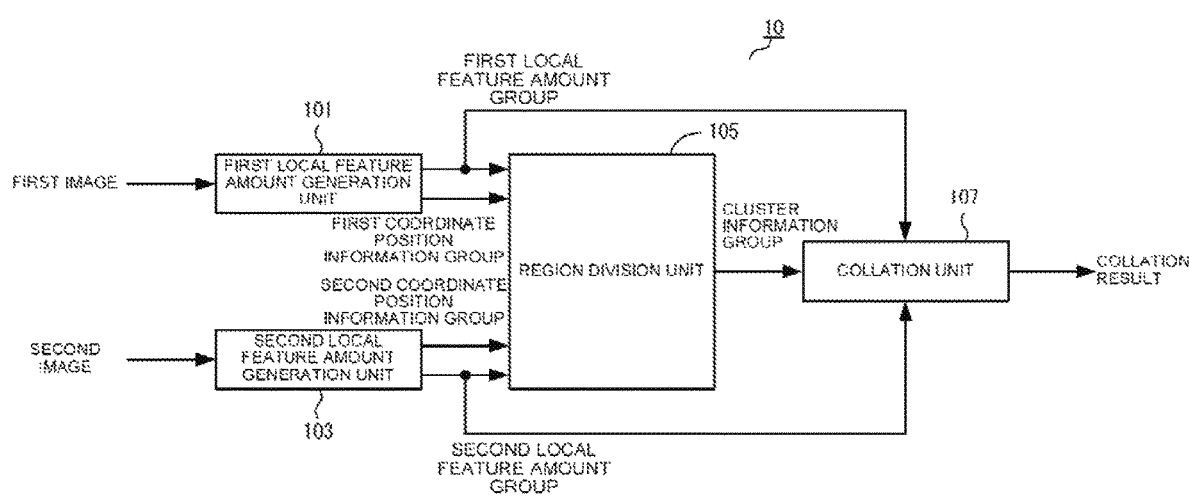
FIG. 22 is a diagram showing a configuration of the image processing apparatus according to an eighth exemplary embodiment.

The eighth exemplary embodiment is described hereinafter with reference to FIGS. 22 to 24. First of all, the functional configurations of the image processing apparatus 10 according to the present embodiment are described with reference to FIG. 22. FIG. 22 is a functional block diagram showing the functional configurations of the image processing apparatus 10 according to the present embodiment.

As shown in FIG. 22, the functional configurations of the image processing apparatus 10 according to the present embodiment are the same as those described in the fifth exemplary embodiment, except for the configurations and operations of the region division unit 105. The configurations and operations of the region division unit 105 are described below with reference to FIG. 23.

Figure 23:
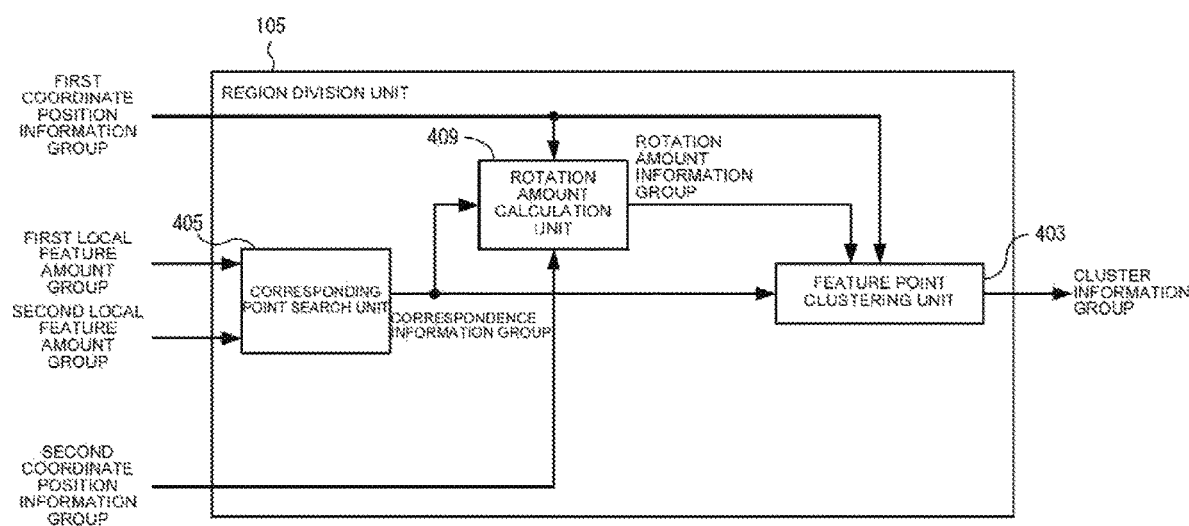
FIG. 23 is a diagram showing a configuration of the region division unit according to the eighth exemplary embodiment.

FIG. 23 is a diagram showing the configurations of the region division unit 105 according to the present embodiment. As shown in FIG. 23, the region division unit 105 includes the corresponding point search unit 405, rotation amount calculation unit 409, and feature point clustering unit 403. The operations of the corresponding point search unit 405 and of the rotation amount calculation unit 409 are the same as those described in the fifth embodiment; thus, the descriptions thereof are omitted accordingly. The operations of the feature point clustering unit 403 are mainly described hereinafter.

Using the first coordinate position information group output by the first local feature amount generation unit 101, the correspondence information group output by the corresponding point search unit 405, and the rotation amount information group output by the rotation amount calculation unit 409, the feature point clustering unit 403 clusters the feature points of the first image and outputs a cluster information group representing the clustering result to the collation unit 107. In order to cluster the feature points, for example, the feature points with a small difference in the calculated rotation amount may be sorted out into the same cluster (the feature points with a great difference in the rotation amount may be sorted out into different clusters). The feature points may be clustered by, for example, graph cut. For instance, edge values may be calculated based on the distance between the feature points taken as nodes and the difference in the rotation amount (e.g., the smaller the value of the distance between the feature points and the smaller the difference in the rotation amount, the greater the edge value between two nodes), and graph cut may be executed on the resultant graph. The graph cut method may be, for example, the normalized cut method or Markov Cluster Algorithm.

8.2 Flow of Processes

Figure 24:
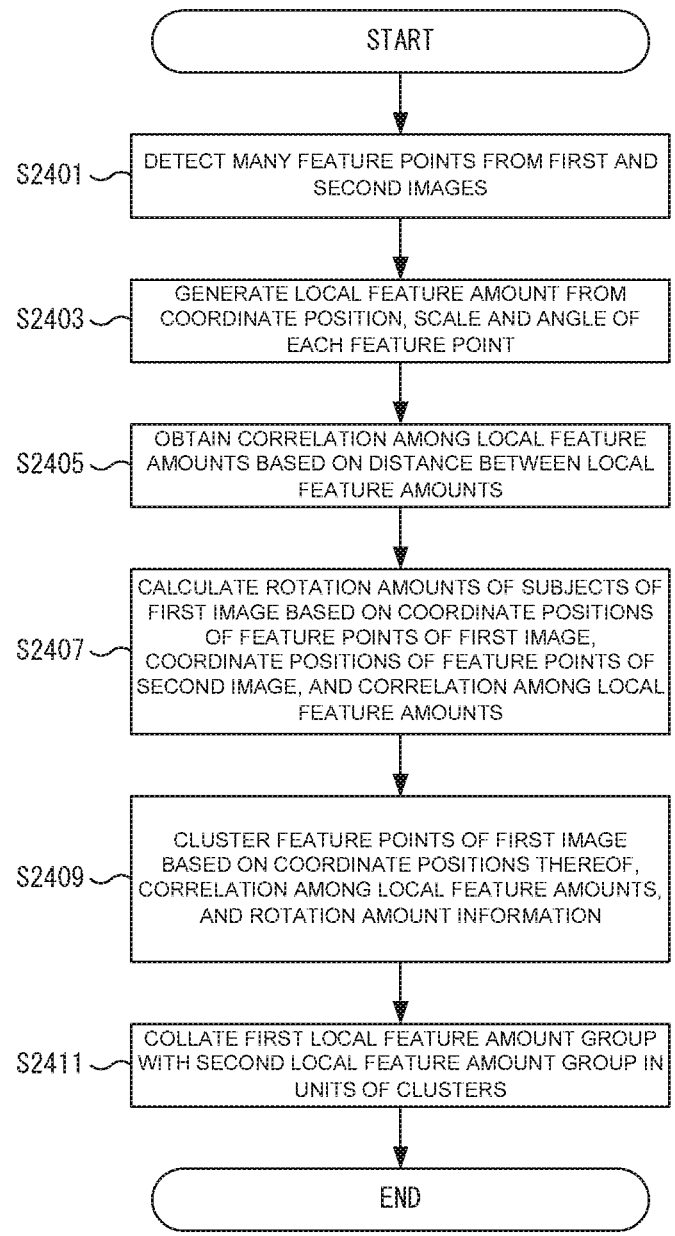
FIG. 24 is a flowchart showing a flow of processes executed by the image processing apparatus according to the eighth exemplary embodiment.

FIG. 24 is a flowchart showing a flow of processes executed by the image processing apparatus 10 according to the present embodiment. The flow of processes executed by the image processing apparatus 10 is described hereinafter with reference to FIG. 24.

The first local feature amount generation unit 101 detects a number of feature points from the first image. The second local feature amount generation unit 103 detects a number of feature points from the second image (S2401). Next, the first local feature amount generation unit 101 and the second local feature amount generation unit 103 each generate a local feature amount from the coordinate position of each of the feature points (S2403).

The region division unit 105 obtains the correlation among the local feature amounts, i.e., the correlation among the feature points in the two images, based on the distance between each of the local feature amounts of the first local feature amount group and each of the local feature amounts of the second local feature amount group (S2405). The region division unit 105 then calculates the rotation amount of each subject in the first image by using the first coordinate position information group, the second coordinate position information group, and the correlation information group (S2407). The region division unit 105 then clusters the feature points of the first image by using the first coordinate position information group, the correspondence information group, and the rotation information group (S2409). The collation unit 107 collates the first local feature amount group with the second local feature amount group in units of clusters, thereby identifying the identical or similar subjects in the images (S2411).

8.3 Effects of the Present Embodiment

As described above, the image processing apparatus 10 according to the eighth embodiment estimates the rotation amount of each subject in the first image by using the coordinate position of each of the feature points of the first image, the coordinate position of each of the feature points of the second image, and the correlation among the feature points in the two images. Then, the feature points of the first image are clustered based on the estimated rotation amounts and the first coordinate position information group, and the first local feature amount group is collated with the second local feature amount group in units of clusters, whereby the identical or similar subjects are identified in the images. Therefore, the same effects as those described in the first embodiment can be achieved when the adjacent, identical or similar subjects in the first image vary in rotation amount.

9 Supplementary Notes

Note that the configurations described in the foregoing exemplary embodiments may be combined or partially replaced with each other. Moreover, the configurations of the present invention are not limited to the foregoing embodiments and may be changed in various forms without departing from the scope of the present invention.

In addition, the foregoing embodiments can be described partially or entirely as in the following supplementary notes but are not limited thereto.

(Note 1)

An image processing apparatus, comprising: first feature amount generating means for generating, with respect to a plurality of feature points to be detected from a first image, a first local feature amount group including local feature amounts representing feature amounts of a plurality of local regions containing the respective feature points, and a first coordinate position information group including coordinate position information; region dividing means for clustering the feature points of the first image based on the first coordinate position information group; and collation means for collating, in units of clusters, the first local feature amount group with a second local feature amount group formed from local feature amounts of feature points detected from a second image.

(Note 2)

The image processing apparatus according to Note 1, wherein the region dividing means clusters the feature points of the first image in accordance with an inter-feature point distance.

(Note 3)

The image processing apparatus according to Note 1 or 2, wherein the region dividing means clusters the feature points of the first image by using a degree of similarity between the local feature amounts of the first local feature amount group and the first coordinate position information group.

(Note 4)

The image processing apparatus according to any one of Notes 1 to 3, wherein the region dividing means calculates a correspondence information group representing a correlation between the feature points of the first and second images based on an inter-feature amount distance between the first local feature amount group and the second local feature amount group, and clusters the feature points of the first image by using the correspondence information group and the first coordinate position information group.

(Note 5)

The image processing apparatus according to Note 4, wherein the region dividing means clusters the feature points of the first image based on a coordinate position of a predefined reference point, in the first image, of the second image, the coordinate position being estimated based on a relative coordinate position of each of the feature points of the second image and the reference point, the correspondence information group, and the first coordinate position information group.

(Note 6)

The image processing apparatus according to Note 5, wherein the region dividing means calculates a ratio between a distance between any two feature points of the first image and a distance between two feature points of the second image that correspond to the two feature points of the first image, by using the first coordinate position information group, a second coordinate position information group, which is coordinate position information on the feature points detected from the second image, and the correspondence information group, and calculates a rotation amount of a subject of the first image by using the first coordinate position information group, the second coordinate position information group, and the correspondence information group.

(Note 7)

The image processing apparatus according to Note 6, wherein the region dividing means clusters the feature points of the first image by using the first coordinate position information group and either one of the ratio and the rotation amount.

(Note 8)

The image processing apparatus according to Note 6 or 7, wherein the region dividing means clusters the feature points of the first image by using the coordinate position, in the first image, of the reference point of the second image, the coordinate position being estimated using the rotation amount, the ratio, the relative coordinate position, and the first coordinate position information group.

(Note 9)

An image processing method, comprising the steps of: generating, with respect to a plurality of feature points to be detected from a first image, a first local feature amount group including local feature amounts representing feature amounts of a plurality of local regions containing the respective feature points, and a first coordinate position information group including coordinate position information clustering the feature points of the first image based on the first coordinate position information group; and collating, in units of clusters, the first local feature amount group with a second local feature amount group formed from local feature amounts of feature points detected from a second image.

(Note 10)

A program for causing an image processing apparatus to execute the steps of: generating, with respect to a plurality of feature points to be detected from a first image, a first local feature amount group including local feature amounts representing feature amounts of a plurality of local regions containing the respective feature points, and a first coordinate position information group including coordinate position information; clustering the feature points of the first image based on the first coordinate position information group; and collating, in units of clusters, the first local feature amount group with a second local feature amount group formed from local feature amounts of feature points detected from a second image.

This application claims priority based on Japanese Patent Application No. 2012-147239 filed on Jun. 29, 2012, the contents of which are hereby incorporated by reference.

10 Image processing apparatus
101 First local feature amount generation unit
103 Second local feature amount generation unit
105 Region division unit
107 Collation unit
401 Similarity calculation unit
403 Feature point clustering unit
405 Corresponding point search unit
407 Ratio calculation unit
409 Rotation amount calculation unit
411 Relative coordinate position database

The invention claimed is:

1. An image processing apparatus, comprising:
a non-transitory storage device storing instructions; and
one or more processors configured by the instructions to:
generate, with respect to a plurality of feature points to be detected from a first image, a first local feature amount group including local feature amounts representing feature amounts of a plurality of local regions containing the respective feature points;

generate one or more first coordinate position information groups which include coordinate position information;

calculate a correspondence information group representing a correlation between a correlation between the feature points of the first image and feature points of a second image based on an inter-feature amount distance between the first local feature amount group and second local feature amount groups which is formed from local feature amounts of feature points detected from the second images;

calculate a rotation amount of a subject of the first image by using the first coordinate position information groups, second coordinate position information groups, which are coordinate position information on the feature points detected from the second image, and the correspondence information groups;

cluster the feature points of the first image based on a coordinate position of a predefined reference point, in the first image, of the second image, the coordinate position being estimated based on a relative coordinate position of each of the feature points of the second image and the reference point, the correspondence information groups, and the first coordinate position information groups and the rotation amount;

divide the first image into regions in accordance with the result of the clustering;

the first local feature amount groups for the respective regions of the first image with the second local feature amount group from the second image; and identify different subjects within the first and second images based on the collated first and second local feature amount groups.

2. The image processing apparatus according to claim 1, wherein the one or more processors are configured by the instructions to cluster the feature points of the first image in accordance with an inter-feature point distance.

3. The image processing apparatus according to claim 1, wherein the one or more processors are configured by the instructions to cluster the feature points of the first image by using a degree of similarity between the local feature amounts of the first local feature amount groups and the first coordinate position information groups.

4. The image processing apparatus according to claim 1, wherein the one or more processors are configured by the instructions to:

calculate a ratio between a distance between any two feature points of the first image and a distance between two feature points of the second image that correspond to the two feature points of the first image, by using the first coordinate position information groups, a second coordinate position information groups, which is coordinate position information on the feature points detected from the second image, and the correspondence information groups.

5. The image processing apparatus according to claim 4, wherein the one or more processors are configured by the instructions to cluster the feature points of the first image by using the coordinate position, in the first image, of the reference point of the second image, the coordinate position being estimated using the rotation amount, the ratio, the relative coordinate position, and the first coordinate position information groups.

6. An image processing method comprising:

generating, with respect to a plurality of feature points to be detected from a first image, a first local feature amount group including local feature amounts representing feature amounts of a plurality of local regions containing the respective feature points;

generating one or more first coordinate position information groups which include coordinate position information;

calculating a correspondence information group representing a correlation between a correlation between the feature points of the first image and feature points of a second image based on an inter-feature amount distance between the first local feature amount group and second local feature amount groups which is formed from local feature amounts of feature points detected from the second images;

calculating a rotation amount of a subject of the first image by using the first coordinate position information groups, second coordinate position information groups, which are coordinate position information on the feature points detected from the second image, and the correspondence information groups;

clustering the feature points of the first image based on a coordinate position of a predefined reference point, in the first image, of the second image, the coordinate position being estimated based on a relative coordinate position of each of the feature points of the second image and the reference point, the correspondence information groups, and the first coordinate position information groups and the rotation amount;

dividing the first image into regions in accordance with the result of the clustering;

collating the first local feature amount groups for the respective regions of the first image with the second local feature amount group from the second image; and identifying different subjects within the first and second images based on the collated first and second local feature amount groups.

7. A non-transitory computer readable storage medium storing a program for causing an image processing apparatus to execute the program for:

generating, with respect to a plurality of feature points to be detected from a first image, a first local feature amount group including local feature amounts representing feature amounts of a plurality of local regions containing the respective feature points;

generating one or more first coordinate position information groups which include coordinate position information;

calculating a correspondence information group representing a correlation between a correlation between the feature points of the first image and feature points of a second image based on an inter-feature amount distance between the first local feature amount group and second local feature amount groups which is formed from local feature amounts of feature points detected from the second images;

calculate a rotation amount of a subject of the first image by using the first coordinate position information groups, second coordinate position information groups, which are coordination position information on the feature points detected from the second image, and the correspondence information groups;

clustering the feature points of the first image based on a coordinate position of a predefined reference point, in the first image, of the second image, the coordinate position being estimated based on a relative coordinate position of each of the feature points of the second image and the reference point, the correspondence information groups, and the first coordinate position information groups and the rotation amount;
dividing the first image into regions in accordance with the result of the clustering;
collating, the first local feature amount groups for the respective regions of the first image with the second local feature amount group from the second image; and
identifying different subjects within the first and second images based on the collated first and second local feature amount groups.

* * * * *